US012722209B2

(12) United States Patent
Matlik

(10) Patent No.: US 12,722,209 B2
(45) Date of Patent: Sep. 1, 2026

(54) CLAMPING DEVICE FOR TOOL HOLDER

(71) Applicant: AB SANDVIK COROMANT, Sandviken (SE)

(72) Inventor: Gunnar Matlik, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 754 days.

(21) Appl. No.: 18/008,998

(22) PCT Filed: Jun. 7, 2021

(86) PCT No.: PCT/EP2021/065128

§ 371 (c)(1),
(2) Date: Dec. 8, 2022

(87) PCT Pub. No.: WO2021/249917

PCT Pub. Date: Dec. 16, 2021

(65) Prior Publication Data

US 2023/0271261 A1 Aug. 31, 2023

(30) Foreign Application Priority Data

Jun. 9, 2020 (EP) .................................... 20178911

(51) Int. Cl.
*B23B 31/26* (2006.01)
*B23B 31/30* (2006.01)

(52) U.S. Cl.
CPC .......... *B23B 31/265* (2013.01); *B23B 31/302* (2013.01); *B23B 2231/12* (2013.01)

(58) Field of Classification Search
CPC .. B23B 2231/12; B23B 31/302; B23B 31/265
See application file for complete search history.

(56) References Cited

U.S. PATENT DOCUMENTS 6,257,122 B1 * 7/2001 Michler ................ B23B 31/302
92/110
6,370,995 B1 4/2002 Skoog
(Continued)

FOREIGN PATENT DOCUMENTS

CN 101992308 A 3/2011
DE 2404801 A1 8/1975
(Continued)

OTHER PUBLICATIONS

EP-3587010-A1 PE2E translation (Year: 2011).*
JP-2002126966-A PE2E translation (Year: 2020).*

*Primary Examiner* — Sunil K Singh
*Assistant Examiner* — Dustin James Trujillo
(74) *Attorney, Agent, or Firm* — Corinne R. Gorski

(57) ABSTRACT

A clamping device for releasably holding a tool holder shank includes a spindle rotatably mounted inside a housing, a drawbar axially moveable in a bore in the housing, engagement members moveable under the effect of the drawbar into locking engagement with the tool holder shank, an actuating member slidably mounted to the spindle, a motion transferring mechanism for transferring an axial movement of the actuating member into a movement of the drawbar, and a hydraulic actuator with a piston unit for moving the actuating member. A valve assembly with two parallel and oppositely directed check valves provides a residual hydraulic pressure in a hydraulic chamber of the hydraulic actuator that will affect an automatic return movement of the piston unit after a movement of the drawbar to a retracted locking position.

13 Claims, 10 Drawing Sheets

(56) References Cited

U.S. PATENT DOCUMENTS

| | | | | |
|---|---|---|---|---|
| 9,120,159 | B2 * | 9/2015 | Suzuki | B23B 31/265 |
| 11,130,208 | B2 * | 9/2021 | Passerini | B23B 31/204 |
| 2011/0074121 | A1 | 3/2011 | Hangleiter | |
| 2018/0339383 | A1 * | 11/2018 | Park | B23B 31/265 |

FOREIGN PATENT DOCUMENTS

| | | | | |
|---|---|---|---|---|
| EP | 1468767 | B1 | 12/2016 | |
| EP | 3587010 | A1 * | 1/2020 | B23B 31/2072 |
| JP | 2002126966 | A * | 5/2002 | B23Q 11/0883 |

* cited by examiner 2b
13
43
44
33
31
2a
2
5
70
71
73
L
35
34
6
35
72
75
74
5a
7
9
20
15
8
31

70
2
15
13
VII
6
L
VII 70
9
74
2
27
20
14
13
AD1
35
5
17
L
α
β
75
71
8
34
31
15
44

31
32
35
15
13
8
2

60
62
61
2a
70
2
2b
63
L
66
15
28
13
AD1

62
62
2b
60
15
61
2a
66
14
13
28
63
2
9
31
35
35
31
L
20
5
5a
7
8
62

2b
2
17
5
30
41
35
40
44
36
38
33
34
43
37
39
32
31
12
10
11
73
9
72
71
75
2a
70
L
AD1
15
13
8
14
24
25
22
21
23
26
20
27
74

CLAMPING DEVICE FOR TOOL HOLDER

RELATED APPLICATION DATA

This application is a § 371 National Stage Application of PCT International Application No. PCT/EP2021/065128 filed Jun. 7, 2021 claiming priority to EP 20178911.2 filed Jun. 9, 2020.

FIELD OF THE INVENTION AND PRIOR ART

The present invention relates to a clamping device, which is intended to be used for connecting a tool holder to a machine tool.

Within the field of machine tools for metal cutting, the cutting tools, for instance in the form of drills or milling tools, used for machining work pieces of metallic material are often fixed to and rotated together with a tool holder, which in its turn may be detachably clamped to a rotatable spindle of the machine tool in order to be rotated together with the spindle. It is previously know to clamp a shank of such a tool holder to a rotatable spindle by means of a clamping mechanism arranged in the spindle. When the cutting tool needs to be exchanged, the tool holder is released from the spindle and a new tool holder with another cutting tool is clamped to the spindle.

A clamping device comprising a spindle with a clamping mechanism adapted for an automatic tool changing operation is previously known from EP 1 468 767 B1. In the clamping device according to EP 1 468 767 B1, an actuating member in the form of a first drawbar is slidably mounted inside the spindle and configured to effect an axial displacement of a second drawbar via a force amplifying mechanism comprising a number of co-operating wedges arranged between the drawbars. A gas spring inside the spindle is configured to urge the two drawbars into a retracted locking position, in which a tool holder is clamped to the spindle, and a hydraulic piston may be configured to act on a piston at the rear end of the gas spring in order to achieve a displacement of the two drawbars into an advanced releasing position, in which the tool holder may be released from the spindle.

Object of the Invention

The object of the present invention is to achieve a further development of a clamping device of the above-mentioned type so as to provide a clamping device adapted for an automatic tool changing operation that is improved in at least some aspect.

SUMMARY OF THE INVENTION

According to the invention, said object is achieved by means of a clamping device comprising

- a housing;
- a spindle rotatably mounted inside the housing and having a front end, a rear end and a bore which intersects the front end and extends rearwardly therefrom, wherein a mounting portion for receiving the tool holder shank is provided at a front end of the bore;
- a drawbar slidably mounted inside the bore so as to be reciprocally moveable in the bore along a longitudinal axis thereof between an advanced releasing position and a retracted locking position;
- engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the spindle;
- an actuating member arranged inside the housing, wherein the actuating member is slidably mounted to the spindle so as to be moveable in relation to the spindle in the axial direction thereof;
- a motion transferring mechanism arranged inside the housing, wherein the motion transferring mechanism is mounted to the spindle and configured to transfer an axial movement of the actuating member in a first axial direction in relation to the spindle into a movement of the drawbar from the advanced releasing position to the retracted locking position;
- a hydraulic actuator arranged in or mounted on the housing and configured to move the actuating member axially in relation to the spindle, wherein the hydraulic actuator comprises a piston unit slidably received in a space of the hydraulic actuator and configured to divide this space into first and second hydraulic chambers;
- a first hydraulic line connected to the first hydraulic chamber, wherein hydraulic fluid is feedable into and dischargeable from the first hydraulic chamber via the first hydraulic line; and
- a second hydraulic line connected to the second hydraulic chamber, wherein hydraulic fluid is feedable into and dischargeable from the second hydraulic chamber via the second hydraulic line.

The piston unit is moveable in a first direction by feeding of hydraulic fluid into the first hydraulic chamber via the first hydraulic line in order to allow the piston unit to exert, directly or via a connecting element, a pulling or pushing force on the actuating member in said first axial direction and thereby effect a movement of the drawbar from the advanced releasing position to the retracted locking position, the piston unit being moveable in an opposite second direction by feeding of hydraulic fluid into the second hydraulic chamber via the second hydraulic line.

The clamping device further comprises a valve assembly, in the following referred to as the first valve assembly, which is arranged in the second hydraulic line and comprises:

- first and second flow channels arranged in parallel with each other;
- a first check valve, preferably in the form of a spring-loaded check valve, which is arranged in the first flow channel and which is configured to allow flow of hydraulic fluid through the first flow channel towards the second hydraulic chamber and obstruct flow of hydraulic fluid through the first flow channel away from the second hydraulic chamber; and
- a second check valve, preferably in the form of a spring-loaded check valve, which is arranged in the second flow channel and which is configured to allow flow of hydraulic fluid through the second flow channel away from the second hydraulic chamber when the hydraulic pressure in the second hydraulic chamber exceeds a cracking pressure $p_{C2}$ of the second check valve and obstruct flow of hydraulic fluid through the second flow channel towards the second hydraulic chamber.

According to the invention, the actuating member is rotatable in relation to the piston unit together with the spindle, which implies that the piston unit and all the other parts of the hydraulic actuator may remain stationary during the machining operations when the tool holder is rotated together with the spindle. By avoiding rotating parts in the hydraulic actuator used for moving the actuating member in connection with an automatic tool changing operation, the construction of the hydraulic actuator and the associated hydraulic system is facilitated and no rotary seals that would limit the possible rotational speed of the spindle are required at the interface between the housing and the spindle. The use of a hydraulically operated piston unit for moving the actuating member, and thereby achieving a movement of the drawbar, implies that the clamping device according to the invention is suitable for use in automatic tool changing operations.

The purpose of the above-mentioned first valve assembly is to ensure that a small residual pressure remains in the second hydraulic chamber at the moment when the hydraulically effected movement of the piston unit in the above-mentioned first direction is stopped and the hydraulic pressure in the first hydraulic chamber is released after a movement of the drawbar to the retracted locking position. The magnitude of this residual pressure depends on the cracking pressure $p_{C2}$ of the second check valve and this residual pressure is to effect a short return movement of the piston unit in the above-mentioned second direction in order to release a possible remaining frictional contact between the piston unit and the actuating member or the possible connecting element. Such a contact may remain due to the frictional forces between the piston unit and the associated slide surfaces in the hydraulic actuator. By choosing a check valve with a suitable cracking pressure it is possible to ensure that the piston unit is automatically moved out of contact with the actuating member or the connecting element, as the case may be, after the completion of a tool changing operation, so that there will be no generation of frictional heat at an interface between the piston unit and the actuating member or the connecting element, as the case may be, when the actuating member is rotated together with the spindle at high speed in relation to the piston unit after the tool changing operation. Without a valve assembly of the above-mentioned type, there is at risk for generation of high frictional heat at said interface, which may cause damages to the clamping device. The cracking pressure $p_{C2}$ of the second check valve has to be so high that the product of the cracking pressure $p_{C2}$ and the effective pressure area on the side of the piston unit facing the second hydraulic chamber is higher than the maximum value of the frictional forces between the piston unit and the associated slide surfaces in the hydraulic actuator, and it is preferably in the order of 0.2-2 MPa.

The clamping device according to the present invention may be mounted to a tool turret of a machine tool, wherein the rotatable spindle of the clamping device is connected or connectable to a drive mechanism in the tool turret. However, the clamping device is not limited to use in a tool turret. On the contrary, the rotatable spindle of the clamping device could constitute the main spindle of a machine tool or be connected to such a main spindle without any intermediate tool turret.

According to an embodiment of the invention, the actuating member is configured to assume a self-locking axial position on the spindle when the drawbar has been forced into the retracted locking position under the effect of the actuating member and the motion transferring mechanism, so as to thereby keep the drawbar in the retracted locking position. Hereby, the actuating member is capable of keeping the drawbar in the retracted locking position during rotation of the spindle without requiring any external force from the piston unit, which implies that the piston unit only needs to exert a pulling or pushing force on the actuating member in connection with a tool changing operation when the spindle and the actuating member are in a stationary position.

Smaller pressure peaks may occasionally occur in the hydraulic system connected to the hydraulic actuator. These pressure peaks may be transmitted to the second hydraulic chamber via the second hydraulic line and the above-mentioned first check valve and may cause undesired movements of the piston unit, which in its turn could result in an unintentional movement of the drawbar towards the advanced releasing position. By choosing a check valve with a cracking pressure of at least 0.1 MPa, preferably 0.2 MPa or higher, it is possible to prevent such pressure peaks from being transmitted to the second hydraulic chamber.

According to another embodiment of the invention, the first valve assembly is arranged in or mounted on the housing. Hereby, all components of the clamping device may be arranged in or mounted to the housing, which makes it possible to provide the clamping device in the form a compact unit suitable for detachable mounting to a conventional tool turret of a machine tool. However, the first valve assembly may as an alternative be arranged at a distance from the housing of the clamping device, for instance in a tool turret of a machine tool that is configured to carry the housing.

According to another embodiment of the invention, the clamping device comprises a hydraulic accumulator, preferably in the form of a spring-loaded accumulator, which is arranged in fluid communication with the second hydraulic chamber. When the hydraulic actuator is operated to move the drawbar to the retracted locking position, this hydraulic accumulator will be preloaded to a pressure corresponding to the above-mentioned residual pressure in the second hydraulic chamber defined by the cracking pressure of the second check valve. During the above-mentioned short return movement of the piston unit under the effect of the residual pressure in the second hydraulic chamber, the pressurized hydraulic fluid in the hydraulic accumulator will contribute to the movement of the piston unit and make possible an increased stroke of the piston unit during the return movement for a given value of the maximum residual pressure in the second hydraulic chamber. Thus, by using a hydraulic accumulator, the required cracking pressure $p_{C2}$ of the second check valve is reduced. The hydraulic accumulator is suitably dimensioned for a maximum accumulation pressure that is lower than the cracking pressure $p_{C2}$ of the second check valve, preferably corresponding to 80-90% of the cracking pressure $p_{C2}$ of the second check valve.

According to another embodiment of the invention, the clamping device comprises a second valve assembly, which is arranged in the first hydraulic line and comprises:

third and fourth flow channels arranged in parallel with each other;

a third check valve, preferably in the form of a spring-loaded check valve, which is arranged in the third flow channel and which is configured to allow flow of hydraulic fluid through the third flow channel towards the first hydraulic chamber and obstruct flow of hydraulic fluid through the third flow channel away from the first hydraulic chamber; and a fourth check valve, preferably in the form of a spring-loaded check valve, which is arranged in the fourth flow channel and which is configured to allow flow of hydraulic fluid through the fourth flow channel away from the first hydraulic chamber when the hydraulic pressure in the first hydraulic chamber exceeds a cracking pressure of the fourth check valve and obstruct flow of hydraulic fluid through the fourth flow channel towards the first hydraulic chamber, wherein the cracking pressure $p_{C4}$ of the fourth check valve has such a value that the following condition is fulfilled: $p_{C4}<p_{C2}\cdot A_2/A_1$, where $p_{C2}$ is the cracking pressure of the second check valve, $p_{C4}$ is the cracking pressure of the fourth check valve, $A_1$ is the effective pressure area on the side of the piston unit facing the first hydraulic chamber and $A_2$ is the effective pressure area on the side of the piston unit facing the second hydraulic chamber. The second valve assembly is configured to limit the length of the above-mentioned return stroke of the piston unit in order to prevent the return stroke from causing frictional contact between the piston unit and the actuating member or the connecting element, as the case may be, at the interface through which the piston unit is configured to exert a force on the actuating member when the drawbar is to be moved from the retracted locking position towards the advanced releasing position.

As mentioned above, smaller pressure peaks may occasionally occur in the hydraulic system connected to the hydraulic actuator. These pressure peaks may be transmitted to the first hydraulic chamber via the first hydraulic line and the above-mentioned third check valve and may cause undesired movements of the piston unit. By choosing a check valve with a cracking pressure of at least 0.1 MPa, preferably 0.2 MPa or higher, it is possible to prevent such pressure peaks from being transmitted to the first hydraulic chamber.

According to another embodiment of the invention, the actuating member has the form of a sleeve, wherein the actuating member is arranged around a peripheral wall of the spindle and slidably mounted to this peripheral wall so as to be axially moveable in relation to the spindle. The actuating member may hereby be incorporated in the clamping device in a simple and space-saving manner.

Another embodiment of the invention is characterized in:

- that the motion transferring mechanism comprises two or more wedges spaced apart in the circumferential direction of the spindle, each wedge being received in a respective aperture that extends radially through said peripheral wall of the spindle, wherein the wedges are configured to press the drawbar towards the retracted locking position when they are pressed radially inwards in the associated apertures;
- that each wedge comprises a first pressure receiving surface which faces outwards from the spindle;
- that the actuating member on its inner side is provided with a first pressure applying surface which faces inwards for contacting the first pressure receiving surface on each wedge, the first pressure applying surface having a radial distance to the longitudinal axis that increases as seen in said first axial direction; and
- that the first pressure applying surface is configured to press each wedge radially inwards in the associated aperture by pressing against the first pressure receiving surface on each wedge when the actuating member is moved in said first axial direction.

Since the first pressure applying surface has a radial distance to the longitudinal axis that increases in the first axial direction, a movement of the actuating member in the first axial direction will cause a pressure to be applied by the first pressure applying surface on the first pressure receiving surface of each wedge. This pressure will have a component in the radial direction such that each wedge is pressed radially inwards towards the longitudinal axis.

According to another embodiment of the invention, the first pressure applying surface and the first pressure receiving surfaces are inclined in relation to the longitudinal axis by such an angle $\alpha$ that the wedges will keep the actuating member in a self-locking axial position on the spindle when the drawbar has been forced into the retracted locking position under the effect of the actuating member and the wedges. In this case, the first pressure applying surface and the first pressure receiving surface both extend in the same direction when viewed in a longitudinal section through the spindle. The angle $\alpha$ is chosen so as to be below a self-lock threshold angle, such that the actuating member attains a self-locking axial position in relation to the wedges when the drawbar has been displaced inside the bore into the retracted locking position. To obtain a self-locking axial position, the angle $\alpha$ should be sufficiently small, i.e. below the self-lock threshold angle. A self-locking axial position refers to an axial position in which the static frictional force between the first pressure receiving surface of each wedge and the first pressure applying surface of the actuating member is greater than the opposing force in the plane of friction that is caused by a force applied to the wedges in a radial direction perpendicular to the longitudinal axis. Hence, a self-locking axial position is obtained within an angular range that depends on the coefficient of friction between the first pressure receiving surface of each wedge and the first pressure applying surface of the actuating member. This coefficient of friction depends on various parameters, such as the materials used, coatings on the surfaces, use of lubricants, etc. Hence, the self-lock threshold angle is dependent on such parameters. A person skilled in the art will be able to identify the self-lock threshold angle that apply in each specific case by using common general knowledge and/or routine experiments, or at least predict or assess whether a certain angle is below such a self-lock threshold angle. In general, it is preferred to choose an angle $\alpha$ that is well below the self-lock threshold angle, to thereby ensure a self-locking configuration. A further benefit of using a small angle $\alpha$ is that a force-amplifying effect is achieved, owing to the fact that a small angle $\alpha$ implies that a relatively long axial displacement of the actuating member will result in a relatively short axial displacement of the drawbar. However, a too small angle $\alpha$ may be inefficient and not practically well-functioning. For example, a very small angle $\alpha$ may render it difficult to release the actuating member from the self-locking axial position. The angle $\alpha$ is with advantage between 2° and 10°. With an angle $\alpha$ within this range, a self-locking effect as well as an appropriate force-amplifying effect may be achieved.

Another embodiment of the invention is characterized in:

- that each wedge comprises a second pressure receiving surface which faces outwards from the spindle;
- that the actuating member on its inner side is provided with a second pressure applying surface which faces inwards for contacting the second pressure receiving surface on each wedge, the second pressure applying surface having a radial distance to the longitudinal axis that increases as seen in said first axial direction;
- that the second pressure applying surface and the second pressure receiving surfaces are inclined in relation to the longitudinal axis by an angle $\beta$ which is larger than the angle $\alpha$; and
- that the first and second pressure applying surfaces and the first and second pressure receiving surfaces are arranged consecutively on the actuating member and on each wedge, respectively, such that, upon a movement of the actuating member in the first axial direction, the second pressure applying surface is configured to slide and press against the second pressure receiving surface on each wedge during a first phase of the movement and the first pressure applying surface is configured to slide and press against the first pressure receiving surface on each wedge during a subsequent second phase of the movement.

Hereby, the drawbar may be quickly moved in axial direction during the initial phase of the clamping under the effect of the larger angle β. This initial clamping phase does not require much force. However, during the final phase of the clamping, a great force is required for displacing the drawbar a short distance. When the actual clamping occurs, i.e. when the engagement members assume the above-mentioned first position, the drawbar is moved in axial direction under the effect of the smaller angle α such that the axial movement of the drawbar will be small as compared to the axial movement of the actuating member, which results in a force-amplifying effect, also referred to as "power boost". The angle β is suitably between 10° and 75°, preferably between 35° and 65°, which provides an efficient initial axial movement of the drawbar. By using a steep angle β for the initial axial movement of the drawbar and a small angle α for the actual clamping, the actuating member (and thus the entire clamping device) can be made relatively short in the axial direction while still providing a self-locking clamping mechanism with a significant force-amplifying effect.

According to another embodiment of the invention, the piston unit is annular and extends around the spindle. The piston unit may hereby be incorporated in the housing of the clamping device in a space-saving manner.

Another embodiment of the invention is characterized in:

that an annular external protuberance is provided on the outer side of the actuating member, wherein the piston unit is configured to exert said pulling or pushing force on the actuating member by acting on this external protuberance;

that an annular internal protuberance is provided on an inner side of the piston unit;

that a lock ring is fixed to the piston unit on the inner side thereof, wherein the lock ring and the internal protuberance are spaced apart in the axial direction of the piston unit; and that the external protuberance on the actuating member is received with play in a gap formed between the internal protuberance and the lock ring.

Hereby, the piston unit may be kept in place in axial direction in relation to the actuating member in a simple manner during the rotation of the spindle without any direct contact between the piston unit and the actuating member.

Further advantageous features of the clamping device according to the present invention will appear from the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1:
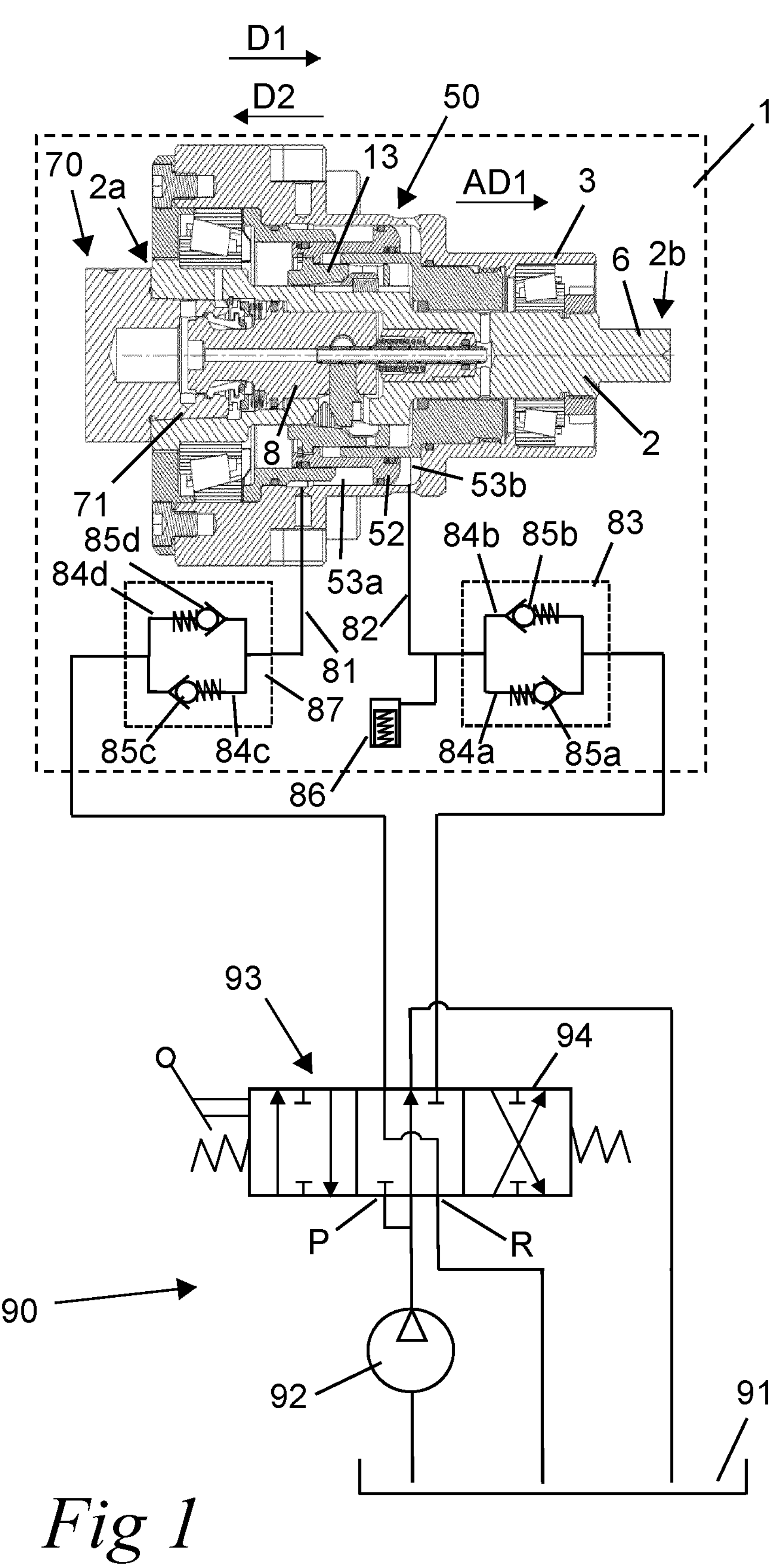
FIG. 1 is a schematic illustration of a clamping device according to an embodiment of the present invention and a tool holder.
Figure 10:
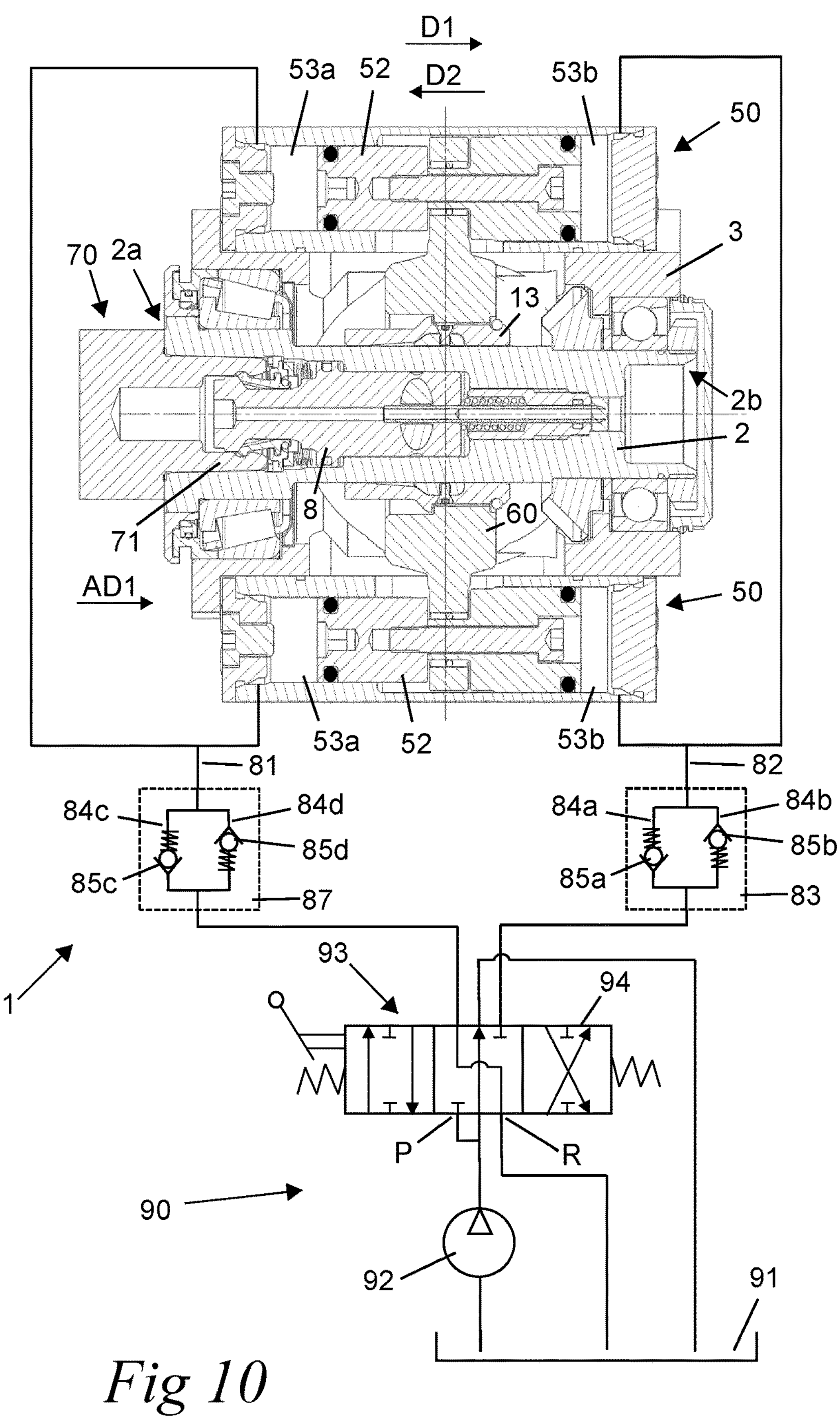
FIG. 10 is a schematic illustration of a clamping device according to another embodiment of the invention.
Figure 11:
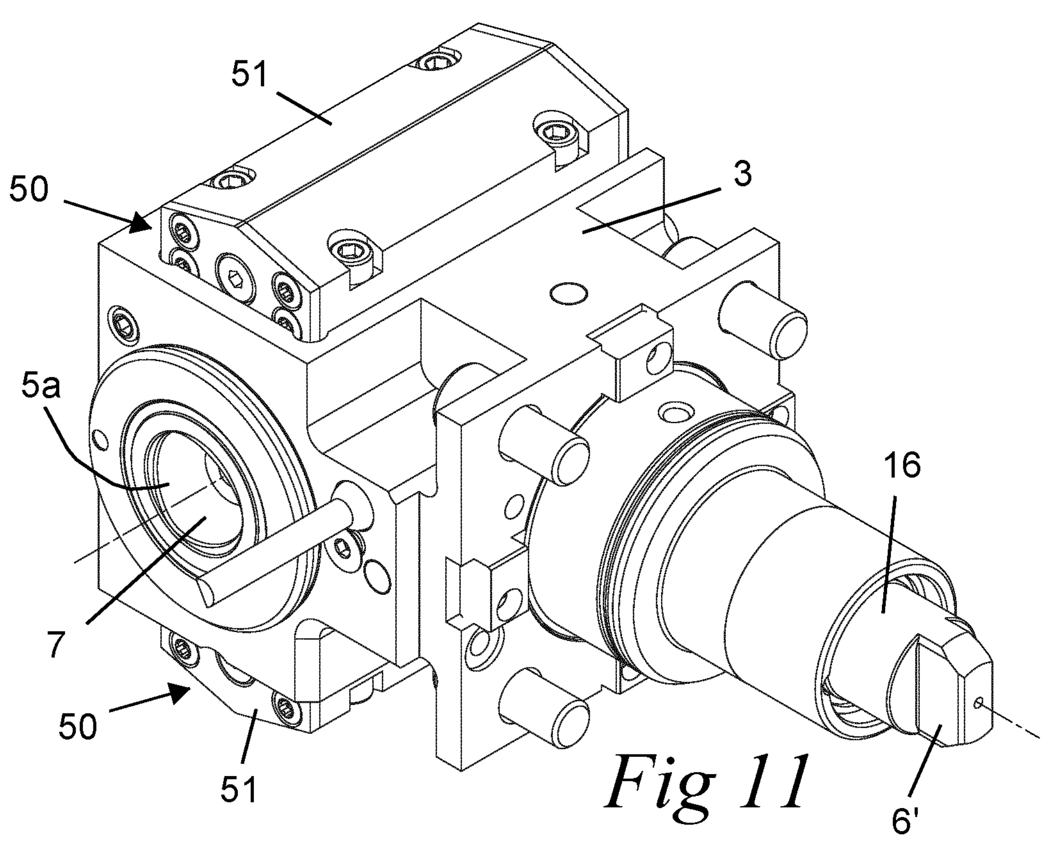
FIG. 11 is a perspective view of parts included in the clamping device of FIG. 10.
Figure 12:
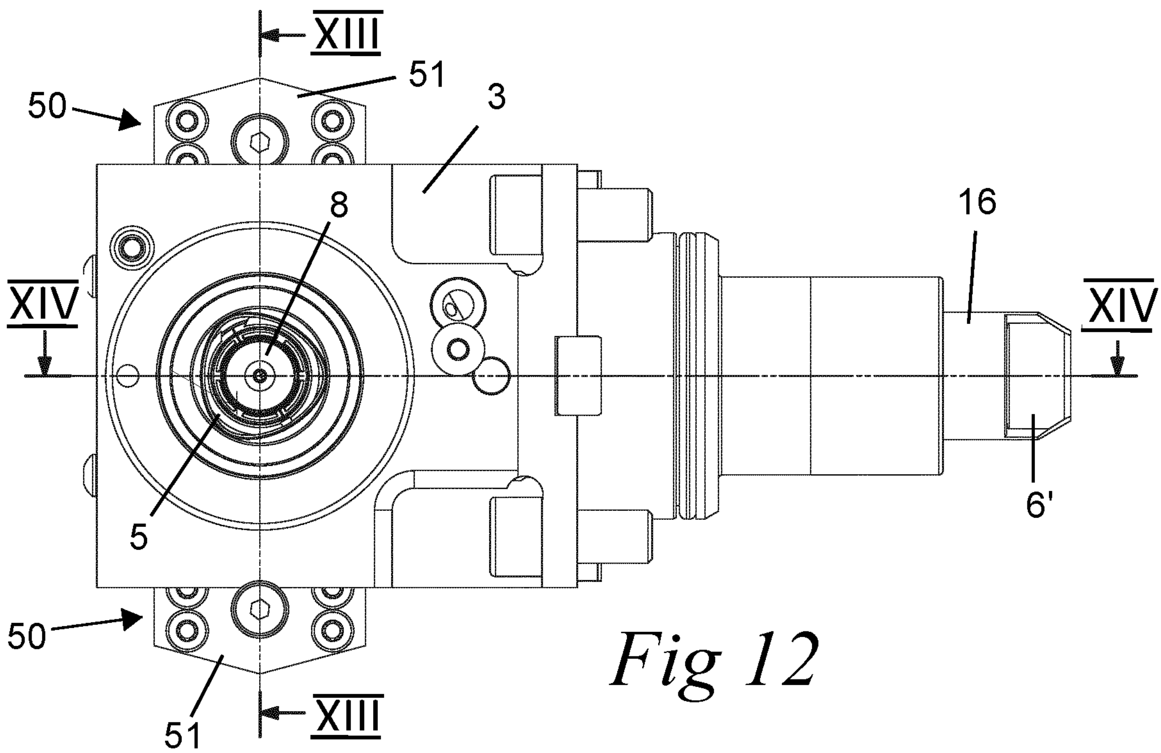
FIG. 12 is a lateral view of the parts shown in FIG. 11.

A clamping device 1 according to a first embodiment of the present invention is schematically illustrated in FIG. 1 and a clamping device according to another embodiment of the invention is schematically illustrated in FIG. 10. The clamping device 1 is configured to releasably clamp a tool holder 70 (very schematically illustrated in the drawings) to a rotatable spindle 2 in the clamping device and enable the machining of a work piece by means of a cutting tool (not shown) fixed to the tool holder 70.

The spindle 2 is rotatably mounted to a housing 3 of the clamping device 1 by means of rolling bearings 4. The spindle 2 has a front end 2_a_, a rear end 2_b_ and a bore 5 which intersects the front end 2_a_ and extends rearwardly therefrom. Thus, the bore 5 has an entrance opening 5_a_ (see FIG. 4) at the front end 2_a_ of the spindle.

In the embodiment illustrated in FIGS. 1-7, the spindle 2 is connectable to a drive mechanism of a machine tool, for instance a drive mechanism in a tool turret of a machine tool, via a connection pin 6 at the rear end 2_b_ of the spindle in order to allow the spindle to be driven in rotation by the drive mechanism.

In the embodiment illustrated in FIGS. 10-19, the clamping device 1 comprises a drive shaft 16, which is rotatably mounted to the housing 3 by means of rolling bearings 18*a*, 18*b*. The drive shaft 16 has a first end 16*a* facing the spindle 2 and an opposite second end 16*b* facing away from the spindle. The drive shaft 16 is connectable to a drive mechanism of a machine tool, for instance a drive mechanism in a tool turret of a machine tool, via a connection pin 6' at the second end 16*b* of the drive shaft in order to allow the drive shaft 16 to be driven in rotation by the drive mechanism. The drive shaft 16 is drivingly connected to the spindle 2 via a bevel gear arrangement 19 consisting of a first bevel gear 19*a*, which is non-rotatably fixed to the drive shaft 16 at the first end 16*a* thereof, and a second bevel gear 19*b*, which is in engagement with the first bevel gear 19*a* and non-rotatably fixed to the spindle 2.

A mounting portion 7 (see FIG. 4) for receiving a mounting shank 71 on the tool holder 70 is provided at a front end of the bore 5. This mounting shank 71 is here referred to as tool holder shank.

Figure 2:
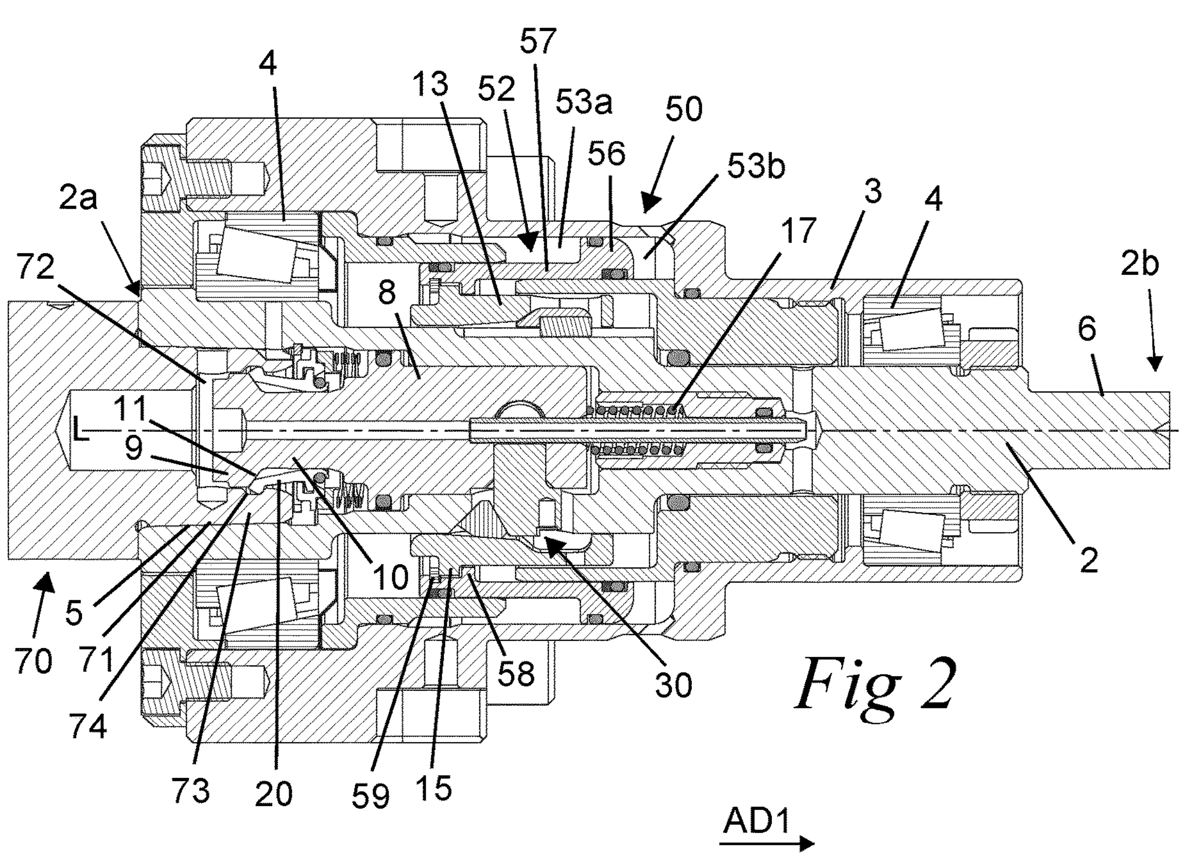
FIG. 2 is a longitudinal section through parts included in the clamping device of FIG. 1, with the drawbar of the clamping device shown in a retracted locking position.
Figures 13, 14:
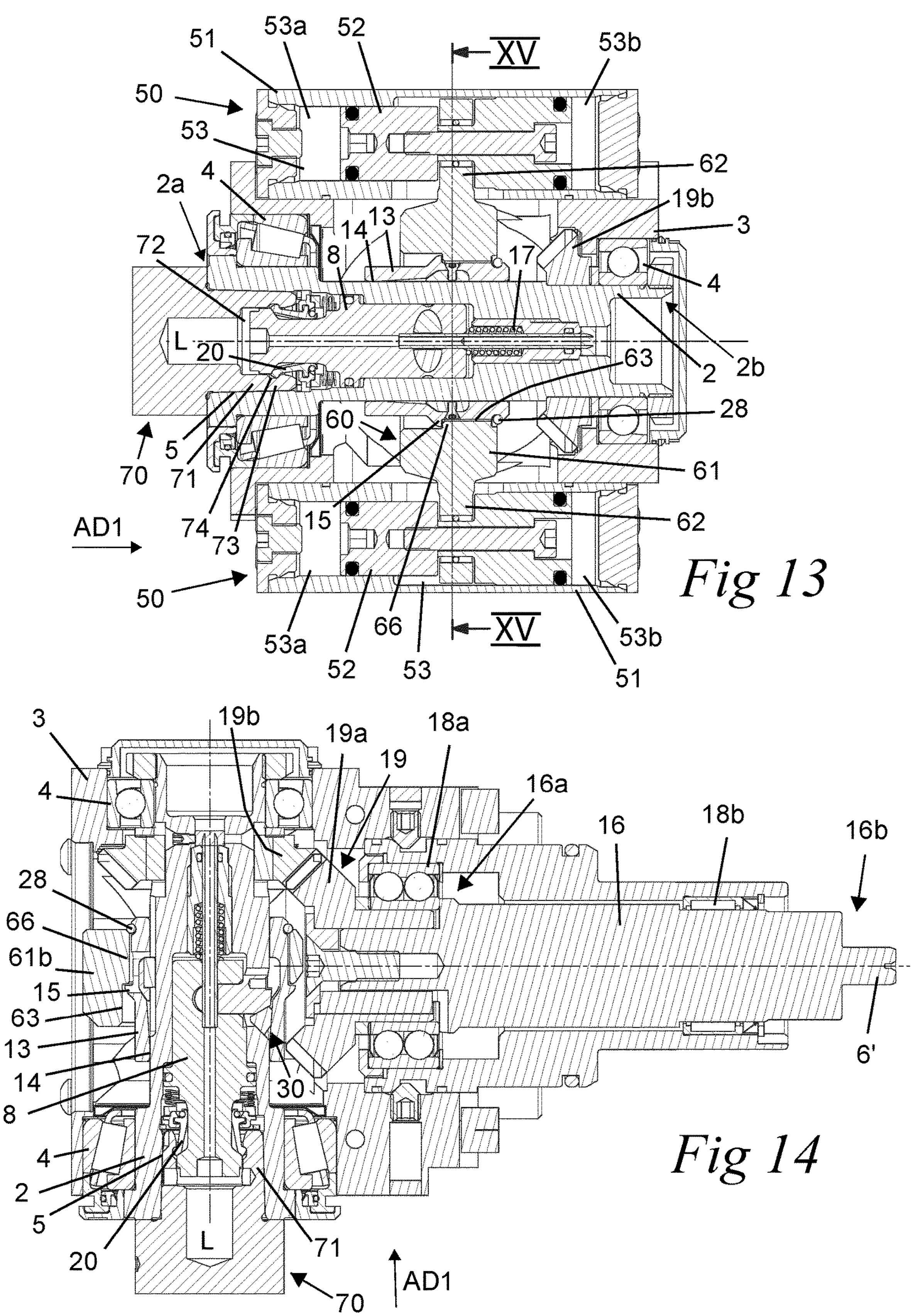
FIG. 13 is a cut according to the line XIII-XIII in FIG. 12.
FIG. 14 is a cut according to the line XIV-XIV in FIG. 12.
Figure 15:
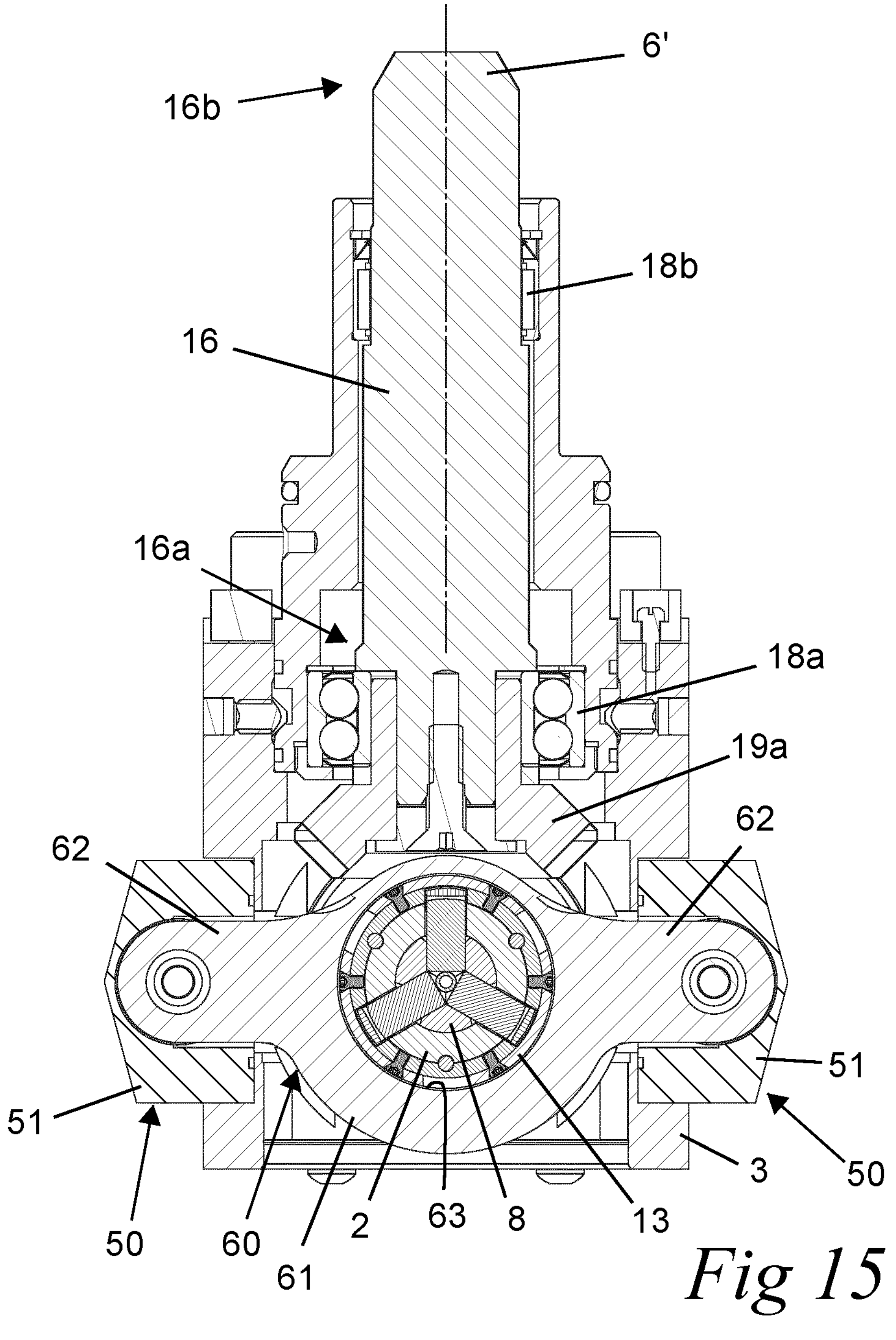
FIG. 15 is a cut according to the line XV-XV in FIG. 13.
Figures 16, 17:
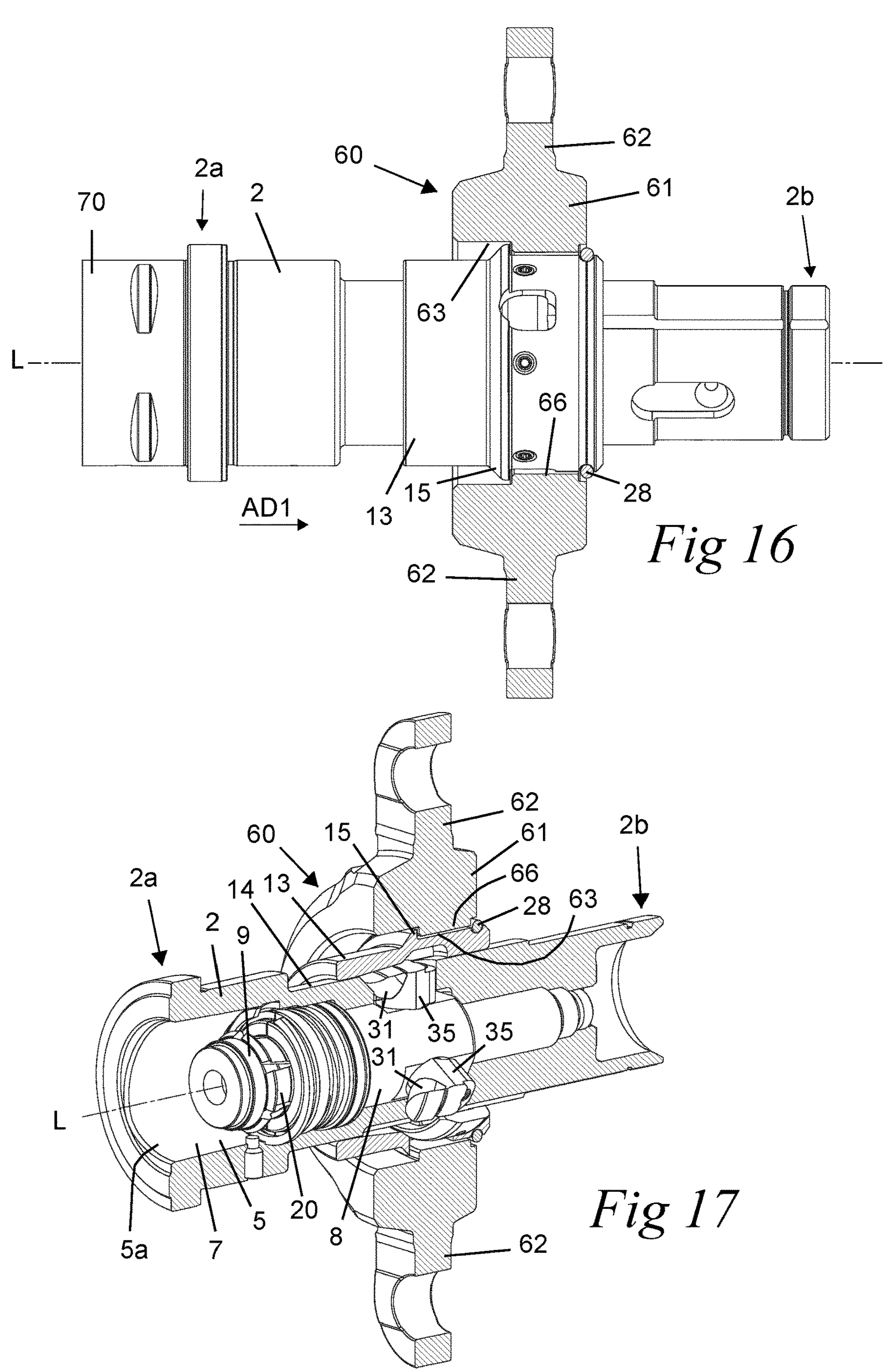
FIG. 16 is a partly cut lateral view of parts included in the clamping device of FIG. 10, with a tool holder clamped to the spindle of the clamping device.
FIG. 17 is a partly cut perspective view of the parts of the clamping device shown in FIG. 16.
Figures 18, 19:
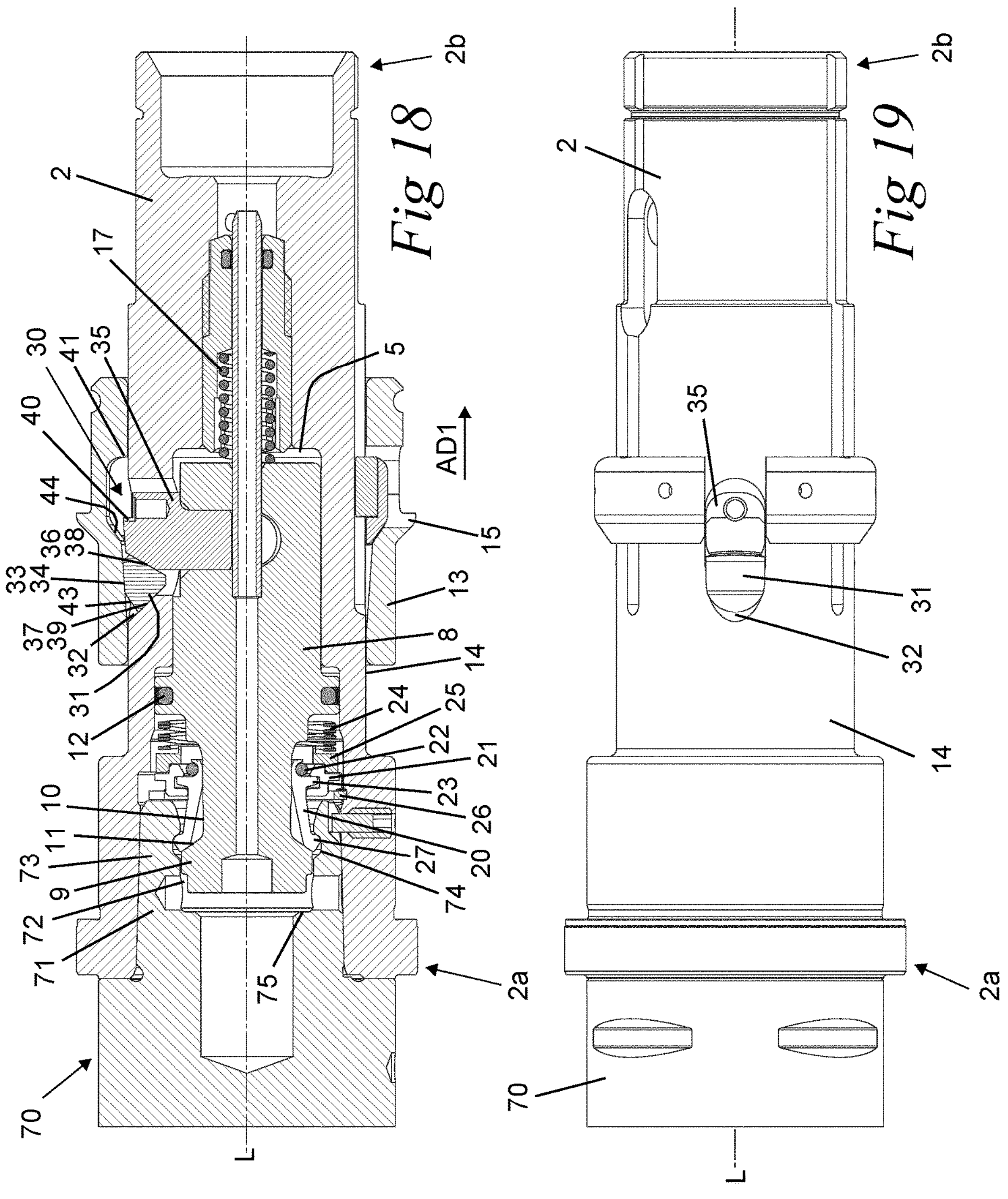
FIG. 18 is a longitudinal section through the tool holder and some of the parts of the clamping device shown in FIG. 16.
FIG. 19 is a planar view from above of the tool holder and the parts of the clamping device shown in FIG. 18, but with the actuating member removed from the spindle.

A drawbar 8 is slidably mounted inside the bore 5 so as to be reciprocally moveable in the bore 5 along a longitudinal axis L thereof between an advanced releasing position (see FIGS. 3 and 6) and a retracted locking position (see FIGS. 2, 13 and 18). The drawbar 8 has a front end facing the entrance opening 5*a* of the bore 5 and an opposite rear end. A head portion 9 and a neck portion 10 are provided at the front end of the drawbar 8. The head portion 9 is located in front of the neck portion 10 as seen in the longitudinal direction of the drawbar, wherein the head portion 9 is connected to the neck portion 10 via a rearwardly facing bevelled surface 11 on the head portion 9.

The tool holder shank 71 is insertable into the mounting portion of the bore 5 via the entrance opening 5*a* at the front end 2*a* of the spindle 2. The head portion 9 of the drawbar is received in an engagement bore 72 in the tool holder shank 71 and a tubular wall 73 of the tool holder shank is received in a space between the head portion 9 and an inner surface of the bore 5. In the illustrated embodiments, the mounting portion 7 of the bore 5 is conically shaped and has a somewhat “triangular” or polygonal, non-circular cross-sectional shape adapted to receive a similarly shaped tool holder shank 71. However, the mounting portion of the bore 5 could also have any other suitable shape for receiving other types of tool holder shanks.

Engagement members 20 in the form of segments are arranged around the drawbar 8 at a front end thereof. Under the effect of a movement of the drawbar 8 from the advanced releasing position to the retracted locking position, the engagement members 20 are moveable from a first position (see FIGS. 3 and 6), in which the engagement members 20 allow the tool holder shank 71 to move into and out of the mounting portion of the bore 5, to a second position (see FIGS. 2, 13 and 18), in which the engagement members 20 are in locking engagement with an engagement groove 74 in the engagement bore 72 in the tool holder shank 71 and thereby keep the tool holder shank 71 secured to the spindle 2.

In the illustrated embodiments, the engagement members 20 are arranged around the neck portion 10 of the drawbar 8 and held in place around the neck portion by means of a retainer ring 21 (see FIG. 18) and an elastic O-ring 22, which are arranged in the bore 5 and surround the neck portion 10. Each engagement member 20 has an outwardly facing flange portion 23 engaged in an inner groove in the retainer ring 21. The O-ring 22 is received in an outwardly facing groove at the rear end of each engagement member 20. A compression spring 24, a thrust ring 25 and a stop ring 26 are also arranged in the bore 5 and configured to surround the drawbar 8. The compression spring 24 is mounted between a shoulder on the drawbar 8 and the thrust ring 25 and it is configured to urge the thrust ring 25, the retainer ring 21 and the engagement members 20 forwards. The forward movement of the retainer ring 21 towards the entrance opening of the bore 5 is limited by the stop ring 26, which is mounted in a groove in an inner surface of the bore 5.

Figures 4, 5, 6, 7:
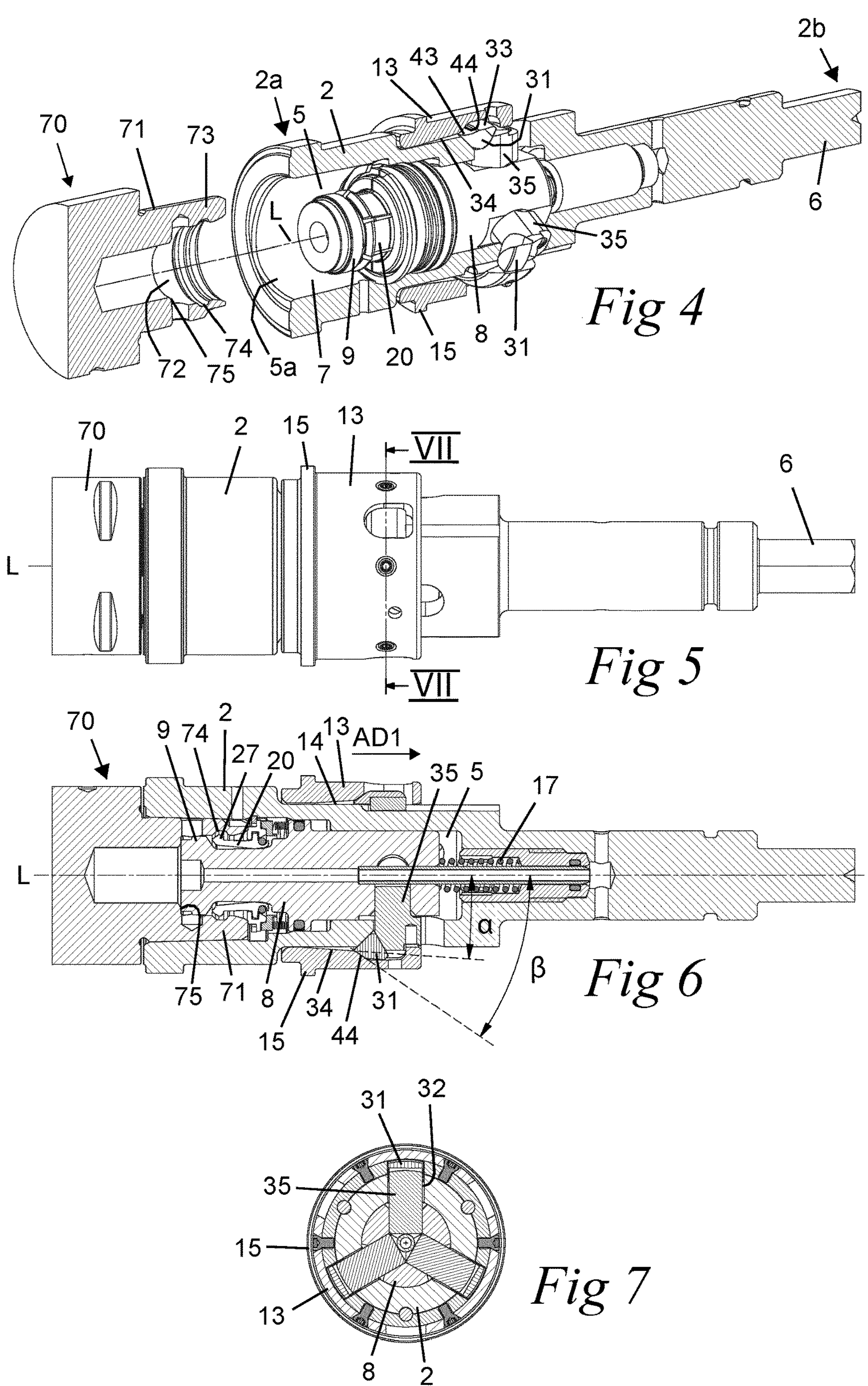
FIG. 4 is a partly cut perspective view the tool holder and parts included in the clamping device of FIG. 1, with the tool holder detached from the spindle.
FIG. 5 is a lateral view of the tool holder and the parts of the clamping device shown in FIG. 4, with the tool holder in an unclamped state.
FIG. 6 is a longitudinal section through the tool holder and the parts of the clamping device shown in FIG. 4, with the tool holder in an unclamped state.
FIG. 7 is a cross-section according to the line VII-VII in FIG. 5.

At its front end, each engagement member 20 is provided with an outwardly directed engagement flange 27, which is configured to be in engagement with the engagement groove 74 in the tool holder shank 71 when the engagement member 20 is in the above-mentioned second position. When the drawbar 8 is in the advanced releasing position, the front ends of the engagement members 20 are located behind the head portion 9 of the drawbar 8 and the engagement flanges 27 are out of engagement with the engagement groove 74 in the tool holder shank 71, as illustrated in FIG. 6. When the drawbar 8 is moved axially rearwards in the bore 5 along the longitudinal axis L thereof, the bevelled surface 11 on the head portion 9 of the drawbar will come into contact with the front ends of the engagement members 20, wherein the front ends of the engagement members 20 will slide on this bevelled surface 11 and be pressed outwards so that the engagement flanges 27 on the engagement members come into engagement with the engagement groove 74 in the tool holder shank 71, whereupon the tool holder shank 71 will be pulled by the drawbar 8 into firm contact with inner surfaces of the spindle 2 within the mounting portion of the bore 5.

The clamping device 1 further comprises an actuating member 13, which is concentric with the spindle 2 and slidably mounted to the spindle so as to be axially moveable in relation to the spindle 2 along the longitudinal axis L. The actuating member 13 is non-rotatably mounted to the spindle 2, i.e. prevented from rotating in relation to the spindle 2, and consequently configured to rotate together with the spindle 2. A motion transferring mechanism 30 is mounted to the spindle 2 and configured to transfer an axial movement of the actuating member 13 in a first axial direction AD1 in relation to the spindle 2 into a movement of the drawbar 8 from the advanced releasing position to the retracted locking position. In the illustrated embodiments, this first axial direction AD1 is a direction towards the rear end 2*b* of the spindle 2. Thus, in this case a movement of the drawbar 8 from the advanced releasing position to the retracted locking position is effected by an axial movement of the actuating member 13 rearwards along the spindle 2. However, as an alternative, the actuating member 13 and the motion transferring mechanism 30 could be arranged to co-operate in such a manner that a movement of the drawbar 8 from the advanced releasing position to the retracted locking position is effected by an axial movement of the actuating member 13 forwards along the spindle 2.

At least one hydraulic actuator 50 is arranged in or mounted on the housing 3 and configured to move the actuating member 13 axially in relation to the spindle 2. Each hydraulic actuator 50 comprises a piston unit 52 slidably received in a space 53 of the hydraulic actuator and configured to divide this space into first and second hydraulic chambers 53*a*, 53*b*. Hydraulic fluid is feedable into and dischargeable from the first hydraulic chamber 53*a* via a first hydraulic line 81 and feedable into and dischargeable from the second hydraulic chamber 53*b* via a second hydraulic line 82. The piston unit 52 is moveable in a first direction D1 by feeding of hydraulic fluid into the first hydraulic chamber 53*a* in order to allow the piston unit 52 to exert a pulling or pushing force on the actuating member 13 in said first axial direction AD1 and thereby effect a movement of the drawbar 8 from the advanced releasing position to the retracted locking position. The piston unit 52 is moveable in an opposite second direction D2 by feeding of hydraulic fluid into the second hydraulic chamber 53*b*.

In the embodiments illustrated in FIGS. 1-9, the clamping device 1 is provided with one single hydraulic actuator 50 arranged in the housing 3.

In the embodiment illustrated in FIGS. 10-19, the clamping device 1 is provided with two hydraulic actuators 50, which are arranged opposite each other on opposite sides of the spindle 2. It would also be possible to use more than two hydraulic actuators 50 distributed around the spindle 2 in any suitable manner. In the embodiment illustrated in FIGS. 10-19, each hydraulic actuator 50 comprises a separate actuator casing 51, which is fixed to the housing 3 on opposite sides thereof. However, the hydraulic actuators 50 may as an alternative be integrated in the housing 3. In the embodiment illustrated in FIGS. 10-19, the clamping device 1 also comprises a connecting element 60, which is configured to form a connection in radial direction between the actuating member 13 and the piston units 52 of the hydraulic actuators 50. The connecting element 60 is configured to transfer an axial movement of the piston units 52 in relation to the housing 3 into a corresponding axial movement of the actuating member 13 in relation to the spindle 2.

The actuating member 13 is configured to assume a self-locking axial position on the spindle 2 when the drawbar 8 has been forced into the retracted locking position under the effect of the actuating member 13 and the motion transferring mechanism 30, so as to thereby allow the actuating member 13 to keep the drawbar 8 in the retracted locking position. Hereby, the piston unit 52 only needs to exert a force on the actuating member 13 in connection with a tool changing operation when the spindle 2 is stationary and the drawbar 8 is to be moved from the retracted locking position to the advanced releasing position and then back to the retracted locking position. In the self-locking axial position, frictional forces between the actuating member 13 and parts of the motion transferring mechanism 30 and/or the spindle 2 that are in contact with the actuating member 13 prevent the actuating member from being axially displaced in a direction opposite to the first axial direction AD1.

The clamping device is connected to a hydraulic system 90, which for instance may have the general design illustrated in FIGS. 1 and 10, where the hydraulic system comprises a hydraulic fluid reservoir 91, a pump 92 and a directional control valve 93, wherein the directional control valve is provided with a pressure port P and a return port R. The pump 92 is configured to pump hydraulic fluid from the reservoir 91 to the pressure port P. The return port R is connected to the reservoir 91 in order to allow hydraulic fluid to be returned from the directional control valve 93 to the reservoir via the return port. The first hydraulic chamber 53*a* of each hydraulic actuator 50 is connected to the directional control valve 93 through the first hydraulic line 81 and the second hydraulic chamber 53*b* of each hydraulic actuator is connected to the directional control valve 93 through the second hydraulic line 82.

The directional control valve 93 is provided with a valve spool 94, which is moveable between:

- a first working position, in which the pressure port P is connected to the first hydraulic line 81 and the return port R is connected to the second hydraulic line 82,
- a second working position, in which the pressure port P is connected to the second hydraulic line 82 and the return port R is connected to the first hydraulic line 81, and
- a normal position, in which the pressure port P is disconnected from the first and second hydraulic lines 81, 82 and the return port R is connected to the first hydraulic line 81.

In FIGS. 1 and 10, the valve spool 94 is shown in the normal position. In the examples illustrated in FIGS. 1 and 10, the valve spool 94 will be moved from the normal position to the first working position by being moved to the right under the effect of an actuating force acting on the valve spool 94 in a first direction, and from the normal position to the second working position by being moved to the left under the effect of an actuating force acting on the valve spool 94 in an opposite direction. The valve spool 94 is configured to automatically return to the normal position on removal of the actuating force.

The clamping device 1 comprises a first valve assembly 83, which is arranged in the second hydraulic line 82 and comprises:

- first and second flow channels 84*a*, 84*b* arranged in parallel with each other;
- a first check valve 85*a*, preferably in the form of a spring-loaded check valve, which is arranged in the first flow channel 84*a* and which is configured to allow flow of hydraulic fluid through the first flow channel 84*a* towards the second hydraulic chamber 53*b* and obstruct flow of hydraulic fluid through the first flow channel 84*a* away from the second hydraulic chamber 53*b*; and
- a second check valve 85*b*, preferably in the form of a spring-loaded check valve, which is arranged in the second flow channel 84*b* and which is configured to allow flow of hydraulic fluid through the second flow channel 84*b* away from the second hydraulic chamber 53*b* when the hydraulic pressure in the second hydraulic chamber exceeds a cracking pressure $p_{C2}$ of the second check valve 85*b* and obstruct flow of hydraulic fluid through the second flow channel 84*b* towards the second hydraulic chamber 53*b*.

The first and second check valves 85*a*, 85*b* are consequently arranged in parallel with each other and in opposite directions. The first valve assembly 83 ensures that a residual pressure corresponding to the cracking pressure $p_{c2}$ of the second check valve 83 will remain in the second hydraulic chamber 53*b* at the moment when the hydraulically effected movement of the piston unit 52 in the first direction D1 is stopped and the first hydraulic chamber 53*a* is connected to the fluid reservoir 91 after a movement of the drawbar 8 to the retracted locking position. This residual pressure will effect a short return movement of the piston unit 52 in the second direction D2.

To be able to effect the above-mentioned return movement of the piston unit 52, the cracking pressure $p_{C2}$ of the second check valve 85*b* has to have such a value that the following condition is fulfilled: $p_{C2}>F_{friction}/A_2$, where $F_{friction}$ is the maximum value of the frictional force between the piston unit 52 and the associated slide surface or slide surfaces in the hydraulic actuator 50 and $A_2$ is the effective pressure area on the side of the piston unit 52 facing the second hydraulic chamber 53*b*. The value of cracking pressure $p_{C2}$ also has to be adapted in dependence on the desired length of the return stroke of the piston unit 52. The cracking pressure $p_{C2}$ of the second check valve 85*b* is preferably in the order of 0.2-2 MPa. The first check valve 85*a* has with advantage a cracking pressure $p_{C1}$ of 0.1 MPa or higher, preferably 0.2 MPa or higher.

In the embodiments illustrated in FIGS. 1 and 10, the clamping device 1 also comprises a second valve assembly 87, which is arranged in the first hydraulic line 81 and comprises:

- third and fourth flow channels 84*c*, 84*d* arranged in parallel with each other;
- a third check valve 85*c*, preferably in the form of a spring-loaded check valve, which is arranged in the third flow channel 84*c* and which is configured to allow flow of hydraulic fluid through the third flow channel 84*c* towards the first hydraulic chamber 53*a* and obstruct flow of hydraulic fluid through the third flow channel 84*c* away from the first hydraulic chamber 53*a*; and
- a fourth check valve 85*d*, preferably in the form of a spring-loaded check valve, which is arranged in the fourth flow channel 84*d* and which is configured to allow flow of hydraulic fluid through the fourth flow channel 84*d* away from the first hydraulic chamber 53*a* when the hydraulic pressure in the first hydraulic chamber exceeds a cracking pressure $p_{C4}$ of the fourth check valve 85*d* and obstruct flow of hydraulic fluid through the fourth flow channel 84*d* towards the first hydraulic chamber 53*a*.

The third and fourth check valves 85*c*, 85*d* are consequently arranged in parallel with each other and in opposite directions. The cracking pressure $p_{C4}$ of the fourth check valve 85*d* has such a value that the following condition is fulfilled: $p_{C4}<p_{C2}\cdot A_2/A_1$, where $p_{C2}$ is the cracking pressure of the second check valve 85*b*, $A_1$ is the effective pressure area on the side of the piston unit 52 facing the first hydraulic chamber 53*a* and $A_2$ is the effective pressure area on the side of the piston unit 52 facing the second hydraulic chamber 53*b*. The third check valve 85*c* has with advantage a cracking pressure $p_{C3}$ of 0.1 MPa or higher, preferably 0.2 MPa or higher.

A hydraulic accumulator 86, preferably in the form of a spring-loaded accumulator, may be arranged in fluid communication with the second hydraulic chamber 53*b* in order to add hydraulic power to the above-mentioned return movement of the piston unit 52. The hydraulic accumulator 86 is dimensioned for a maximum accumulation pressure that is lower than the cracking pressure $p_{C2}$ of the second check valve 85*b*, preferably corresponding to 80-90% of the cracking pressure $p_{C2}$ of the second check valve 85*b*. In the embodiment illustrated in FIG. 1, the hydraulic accumulator 86 is connected to the second hydraulic chamber 53*b* via the second hydraulic line 82.

The first and second valve assemblies 83, 87 and the hydraulic actuator 86 are preferably arranged in or mounted on the housing 3.

In the embodiment illustrated in FIG. 10, the two hydraulic actuator 50 are connected to the hydraulic system 90 in parallel with each other and configured to share the same valve assemblies 83, 87. Thus, in this case, the first valve assembly 83 is connected to the second hydraulic chambers 53*b* of both hydraulic actuators and the second valve assembly 87 is connected to the first hydraulic chambers 53*a* of both hydraulic actuators. If the hydraulic actuators 50 are connected to the hydraulic system 90 in other ways, it would also be possible to provide each hydraulic actuator 50 with its own valve assemblies 83, 87.

In the embodiments illustrated in FIGS. 1-9, the piston unit 52 is annular and configured to surround a part of the spindle 2. In this case, the piston unit 52 is slidably mounted to the housing 3 so as to be hydraulically moveable axially in relation to the housing. In the embodiment illustrated in FIGS. 1-7, the piston unit 52 is configured to move the actuating member 13 in said first axial direction AD1 by exerting an axially directed pulling force on it. In the embodiment illustrated in FIGS. 8 and 9, the piston unit 52 is configured to move the actuating member 13 in the first axial direction AD1 by exerting an axially directed pushing force on it. The annular piston unit 52 is configured to remain stationary in the housing 3 when the spindle 2 is rotated in relation to the housing 3.

In the embodiments illustrated in FIGS. 1-7 and 10-19, the actuating member 13 has the form of a sleeve. In this case, the actuating member 13 is arranged around a peripheral wall 14 of the spindle 2 and slidably mounted to this peripheral wall so as to be axially moveable in relation to the spindle.

In the embodiment illustrated in FIGS. 1-7, the piston unit 52 comprises an annular piston head 56 and a sleeve-shaped piston stem 57 fixed to the piston head, wherein the piston unit 52 is configured to exert the above-mentioned pulling or pushing force on the actuating member 13 through the piston stem 57. The piston head 56 and the piston stem 57 are preferably concentric with the actuating member 13 and extend around the spindle 2. The piston stem 57 may be configured to exert the above-mentioned force on the actuating member 13 by acting on an annular external protuberance 15 provided on the outer side of the actuating member 13. In the embodiment illustrated in FIGS. 1-7, an annular internal protuberance 58 is provided on the inner side of the piston stem 57 and a lock ring 59 is fixed to the piston stem 57 on the inner side thereof, wherein the lock ring 59 and the internal protuberance 58 are spaced apart in the axial direction of the piston stem 57. The external protuberance 15 on the actuating member 13 is received with play in a gap formed between the internal protuberance 58 and the lock ring 59. In this case, axial force is transferred from the piston unit 52 to the actuating member 13 via the lock ring 59 when the piston unit 52 moves the actuating member in the first axial direction AD1 and via the internal protuberance 58 when the piston unit 52 moves the actuating member in the opposite direction.

In the embodiment illustrated in FIGS. 10-19, the connecting element 60 comprises a central part 61, through which the connecting element is connected to the actuating member 13, and arms 62, one for each hydraulic actuator 50, through which the connecting element 60 is connected to the piston units 52 of the hydraulic actuators. Each arm 62 is fixed to the central part 61 and projects from the central part in radial direction. The connecting element 60 may of course be designed in many different manners, depending on the specific design of the clamping device 1.

The connecting element 60 may be fixed to the actuating member 13 so as to be moveable in relation to the spindle 2 in the axial direction thereof together with the actuating member 13, wherein the connecting element is configured to rotate together with the actuating member 13 and the spindle in relation to the piston units 52. However, in the embodiment illustrated in FIGS. 10-19, the actuating member 13 is rotatable in relation to the connecting element 60 together with the spindle 2. In this case, the sleeve-shaped actuating member 13 may extend through a recess 63 with circular cross-sectional shape in the central part 61 of the connecting element 60. In the illustrated embodiment, an annular internal protuberance 66 is provided in said recess 63. Furthermore, an annular external protuberance 15 is provided on the outer side of the actuating member 13 and a lock ring 28 is fixed to the actuating member 13 on the outer side thereof, wherein the lock ring 28 and the external protuberance 15 are spaced apart in the axial direction of the actuating sleeve 13. The internal protuberance 66 on the connecting element 60 is received with play in a gap formed between the external protuberance 15 and the lock ring 28. In this case, axial force is transferred from the connecting element 60 to the actuating sleeve 13 via the lock ring 28 when the piston units 52 move the actuating sleeve 13 in the first axial direction AD1 and via the external protuberance 15 when the piston units 52 move the actuating sleeve in the opposite direction.

In the embodiments illustrated in FIGS. 1-7 and 10-19, a release spring 17, preferably in the form of a helical compression spring, is mounted in a space inside the spindle 2 and configured to act on the rear end of the drawbar 8 in order to urge the drawbar towards the advanced releasing position. The drawbar 8 is moveable, under the effect of the actuating member 13 and the motion transferring mechanism 30, from the advanced releasing position to the retracted locking position against the action of a spring force from this release spring 17.

The motion transferring mechanism 30 may be designed in many different manners. In the embodiments illustrated in FIGS. 1-7 and 10-19, the motion transferring mechanism comprises three wedges 31, which are spaced apart in the circumferential direction of the spindle 2. Each wedge 31 is received in a respective aperture 32 that extends radially through the above-mentioned peripheral wall 14 of the spindle 2, wherein the wedges 31 are configured to press the drawbar 8 towards the retracted locking position when they are pressed radially inwards in the associated apertures 32. Each wedge 31 comprises a first pressure receiving surface 33 which faces outwards from the spindle 2, and the actuating member 13 is on its inner side provided with a first pressure applying surface 34 which faces inwards for contacting the first pressure receiving surface 33 on each wedge. The first pressure applying surface 34 has a radial distance to the longitudinal axis L that increases as seen in the above-mentioned first axial direction AD1. The first pressure applying surface 34 is configured to press the wedges 31 radially inwards in the apertures 32 by pressing against the first pressure receiving surface 33 on each wedge when the actuating member 13 is moved in the first axial direction AD1. The illustrated motion transferring mechanism 30 also comprises three wedge engagement members 35, which project radially from the drawbar 8 into a respective one of the apertures 32 and which are fixed to the drawbar so as to be moveable along the longitudinal axis L together with the drawbar. Thus, a movement of a wedge engagement member 35 along the longitudinal axis L will cause a corresponding movement of the drawbar 8. Each wedge engagement member 35 is in contact with one of the wedges 31. The motion transferring mechanism 30 may comprise any suitable number of wedges 31 and associated wedge engagement members 35 arranged to extend through a corresponding number of apertures 32 in the peripheral wall 14 of the spindle 2.

Each wedge engagement member 35 has a slide surface 36 (see FIG. 18) which faces towards the front end 2*a* of the spindle 2, and each aperture 32 has a slide surface 37 which faces towards the rear end 2*b* of the spindle. Furthermore, each wedge 31 has a first wedge surface 38 which faces towards the rear end 2*b* of the spindle and a second wedge surface 39 which faces towards the front end 2*a* of the spindle, wherein these first and second wedge surfaces 38, 39 approach each other in a radial direction towards the longitudinal axis L. The first wedge surface 38 of each wedge 31 is in contact with the slide surface 36 of the associated wedge engagement member 35 and the second wedge surface 39 of each wedge is in contact with the slide surface 37 of the associated aperture 32. When the wedges 31 are pressed radially inwards in the apertures 32 by the actuating member 13, the first and second wedge surfaces 38, 39 of each wedge 31 will slide and press against the corresponding slide surfaces 36, 37 of the associated wedge engagement member 35 and aperture 32 and thereby force the drawbar 8 to move towards the retracted locking position. The first pressure applying surface 34 and the first pressure receiving surfaces 33 are preferably inclined in relation to the longitudinal axis L by such an angle $\alpha$ (see FIG. 6) that the wedges 31 will keep the actuating member 13 in a self-locking axial position on the spindle 2 when the drawbar 8 has been forced into the retracted locking position under the effect of the actuating member 13 and the wedges 31.

Each wedge 31 may also comprise a second pressure receiving surface 43 which faces outwards from the spindle 2, wherein the actuating member 13 on its inner side is provided with a second pressure applying surface 44 which faces inwards for contacting the second pressure receiving surface 43 on each wedge. The second pressure applying surface 44 has a radial distance to the longitudinal axis L that increases as seen in the first axial direction AD1. The second pressure applying surface 44 and the second pressure receiving surfaces 43 are inclined in relation to the longitudinal axis L by an angle $\beta$ (see FIG. 6) which is larger than the above-mentioned angle $\alpha$. The first and second pressure applying surfaces 34, 44 and the first and second pressure receiving surfaces 33, 43 are arranged consecutively on the actuating member 13 and on each wedge 31, respectively, such that, upon a movement of the actuating member 13 in the first axial direction AD1, the second pressure applying surface 44 is configured to slide and press against the second pressure receiving surface 43 on each wedge during an initial first phase of the movement, whereupon the first pressure applying surface 34 is configured to slide and press against the first pressure receiving surface 33 on each wedge during a subsequent second phase of the movement.

Each wedge engagement member 35 further comprises a release pressure receiving surface 40 (see FIG. 18) which faces towards the rear end 2*b* of the spindle 2, and the actuating member 13 comprises a release pressure applying surface 41 which faces towards the front end 2*a* of the spindle. The release pressure applying surface 41 of the actuating member 13 is configured to come into contact with the release pressure receiving surfaces 40 of the wedge engagement members 35 when the actuating member 13 is moved in the above-mentioned second axial direction, to thereby allow the actuating member to exert a forwardly directed axial force on the drawbar 8 via the wedge engagement members 35 during a final phase of the movement of the drawbar from the retracted locking position to the advanced releasing position.

Figure 3:
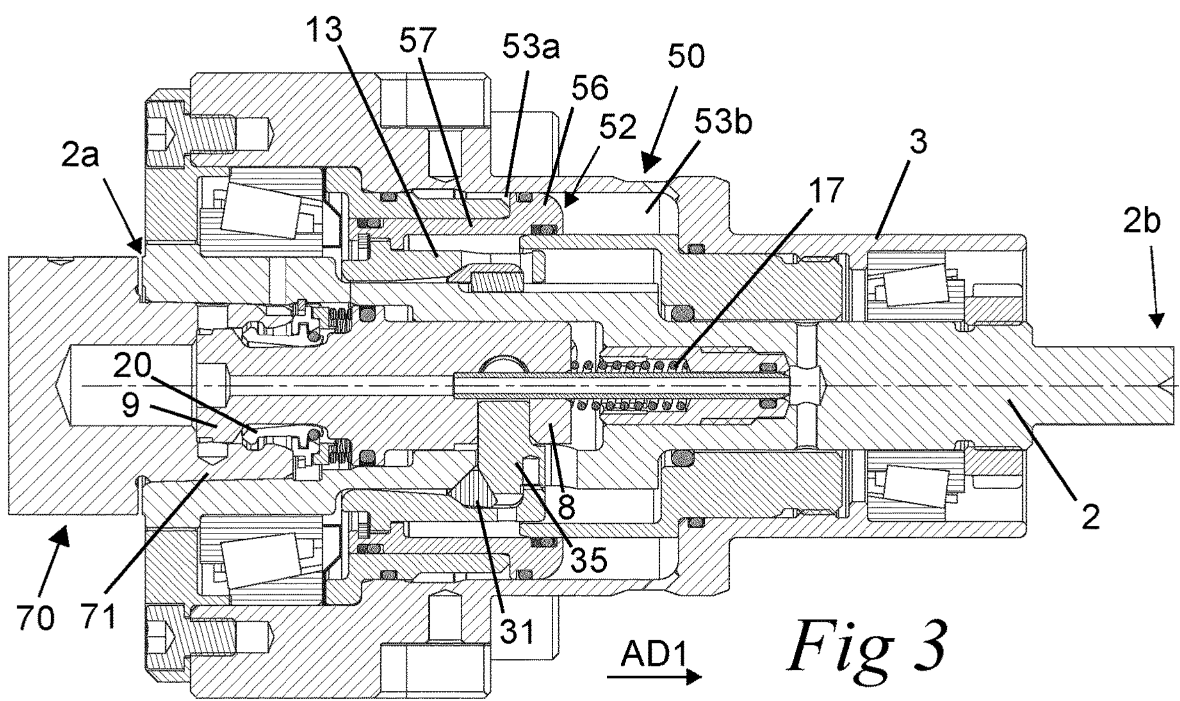
FIG. 3 is a longitudinal section corresponding to FIG. 2, with the drawbar shown in an advanced releasing position.

When a tool holder 70 is to be clamped to the spindle 2, the tool holder shank 71 is inserted into the mounting portion 7 of the bore 5 with the spindle 2 kept in a stationary position and the drawbar 8 positioned in the advanced releasing position, as illustrated in FIGS. 3 and 6. Hereby, the head portion 9 of the drawbar is received in the engagement bore 72 in the tool holder shank 71 and the engagement groove 74 in the tool holder shank 71 is positioned on the outside of the engagement flanges 27 of the engagement members 20. Thereupon, hydraulic oil is fed into the first hydraulic chamber 53*a* of each hydraulic actuator 50 in order to move the piston unit 52 in the first direction D1 and thereby achieve a corresponding axial movement of the actuating member 13. During a first phase of this axial movement of the actuating member 13, the second pressure applying surface 44 on the actuating member 13 will slide and press against the second pressure receiving surfaces 43 on the wedges 31. Hereby, the wedges 31 will be pressed radially inwards and the drawbar 8 will be axially displaced towards the retracted locking position. Due to the relatively steep inclination β of the second pressure applying and receiving surfaces 44, 43, the wedges 31 will initially move inwards rather fast, which results in a relatively quick displacement of the drawbar 8. The relatively steep angle β is advantageous since the initial displacement of the drawbar 8 does not require much force. The first and second pressure applying surfaces 34, 44 and the first and second pressure receiving surfaces 33, 43 are so arranged that when the actuating member 13 has been moved such a distance that the second pressure applying surface 44 has passed the second pressure receiving surface 43 and the first pressure applying surface 34 reaches the first pressure receiving surface 33, i.e. at the transition between these respective surfaces, the drawbar 8 has almost reached its final destination at the rear end of the bore 5. Hence, for the final clamping phase, in which a large force is beneficial, the first pressure applying and receiving surfaces 34, 33 are active. In this phase, a relatively large movement of the actuating member 13 will result in a very small radial displacement of the wedges 31, and an even smaller axial displacement of the drawbar 8, which consequently will provide a force-amplifying effect that will make it possible for the drawbar 8 to pull the tool holder shank 71 with a large force into firm engagement with the spindle 2. Furthermore, the small inclination α of the first pressure applying and receiving surfaces 34, 33 will provide a self-locking effect and make sure that the clamping device will remain in the clamped state without requiring any additional locking means. Hereby, the hydraulic pressure on the piston unit 52 may be released when the drawbar 8 has reached the retracted locking position. When the hydraulic pressure on the piston unit 52 is released, the residual pressure that remains in the second hydraulic chamber 53*b* due to the second check valve 85*b* will automatically move the piston unit 52 a short distance in the second direction D2. In the embodiment illustrated in FIGS. 1-7, this return movement of the piston unit 52 implies that the piston unit is moved out of contact with the actuating member 13. In the embodiment illustrated in FIGS. 10-19, the short return movement of the piston unit 52 results in a movement of the connecting element 60 out of contact with the actuating member 13.

When a tool changing operation is to be performed and the tool holder 70 is to be released from the spindle 2, the rotation of the spindle 2 is stopped and hydraulic oil is fed into the second hydraulic chamber 53*b* in order to move the piston unit 52 in the second direction D2 and thereby achieve a corresponding axial movement of the actuating member 13. When the actuating member 13 is subjected to a sufficient force in the second axial direction D2 by the piston unit 52, the self-locking frictional engagement between the first pressure applying surface 34 on the actuating member 13 and the first pressure receiving surfaces 33 on the wedges 31 will be released, whereupon the actuating member 13 is moveable in relation to the spindle 2 in the second axial direction under the effect of the piston unit 52. When the actuating member 13 is moved in this direction, the spring force exerted by the release spring 17 on the rear end of the drawbar 8 will push the drawbar axially towards the advanced releasing position. Hereby, the wedge engagement members 35 will exert a force on the wedges 31 and press them radially outwards. When the actuating member 13 has been moved a certain distance in the second axial direction, the release pressure applying surface 41 on the actuating member 13 will come into contact with the release pressure receiving surfaces 40 on the wedge engagement members 35, which will allow the actuating member 13 to exert an axial force on the drawbar 8 via the wedge engagement members 35 that will push the outer end of the head portion 9 of the drawbar 8 against a surface 75 in the engagement bore 72 in the tool holder shank 71 and thereby release the tool holder shank 71 from the spindle 2.

Figure 8:
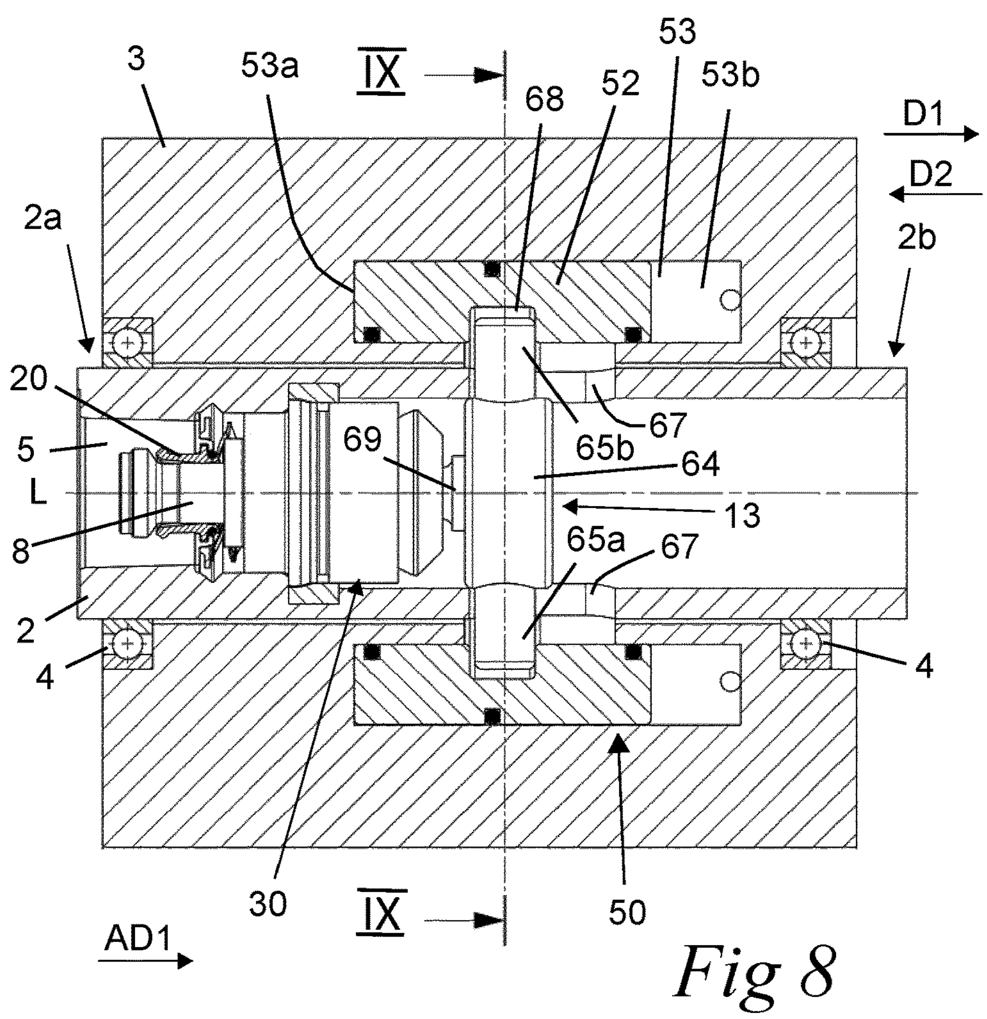
FIG. 8 is a schematic partly cut lateral view of parts included in a clamping device according to an alternative embodiment of the invention.
Figure 9:
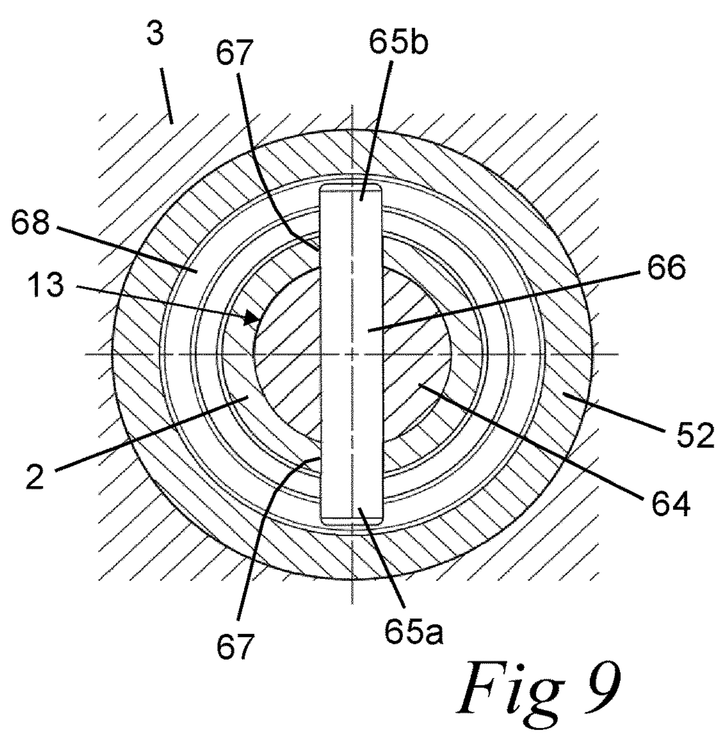
FIG. 9 is a cross-section according to the line IX-IX in FIG. 8.

In the embodiment illustrated in FIGS. 8 and 9, the actuating member 13 comprises a base part 64 with a circular cross-sectional shape, which is slidably received in the bore 5 inside the spindle 2 so as to be moveable in relation to the spindle in the axial direction thereof. In this case, the actuating member 13 also comprises two arms 65*a*, 65*b*, which are fixed to the base part 64 so as to be moveable in relation to the spindle 2 in the axial direction thereof together with the base part 64. The arms 65*a*, 65*b* project in radial direction from the base part 64 on opposite sides thereof. In the illustrated example, the arms 65*a*, 65*b* constitute opposite end sections of a transverse pin 66, which is fixed to and extends across the base part 64 perpendicularly to the centre axis of the base part. Apertures 67 for the arms 65*a*, 65*b* extend radially through a peripheral wall of the spindle 2 on opposite sides of the spindle, wherein each arm 65*a*, 65*b* extends across a respective one of these apertures 67. The apertures 67 are elongated and extend in the axial direction of the spindle 2 so as to allow the arms 65*a*, 65*b* to move in relation to the spindle 2 in the axial direction thereof. The outer end of each arm 65*a*, 65*b* is received with play in an annular groove 68 provided on the inner side of the annular piston unit 52, to thereby allow the piston unit 52 to exert a pushing force on the actuating member 13 and also allow the actuating member 13 to rotate in relation to the piston unit 52 together with the spindle 2. When hydraulic fluid is fed into the first hydraulic chamber 53*a*, the piston unit 52 will push the arms 65*a*, 65*b* and thereby the entire actuating member 13 rearwards in the above-mentioned first axial direction AD1. When hydraulic fluid is fed into the second hydraulic chamber 53*b*, the piston unit 52 will push the arms 65*a*, 65*b* and thereby the entire actuating member 13 forwards in the opposite direction. In this embodiment, the actuating member 13 is configured to act on the motion transferring mechanism 30 via a projection 69, which is fixed to the base part 64 and projects from a front side of the base part towards the front end 2*a* of the spindle 2. The motion transferring mechanism 30 included in the clamping device 1 according to FIGS. 8 and 9 is of the type described in U.S. Pat. No. 6,370,995 B1. Thus, the design and functioning of this motion transferring mechanism is described in closer detail in U.S. Pat. No. 6,370,995 B1.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device for releasably holding a tool holder shank, the clamping device comprising:

a housing;

a spindle rotatably mounted inside the housing and having a front end, a rear end and a bore which intersects the front end and extends rearwardly therefrom, wherein a mounting portion for receiving the tool holder shank is provided at a front end of the bore;

a drawbar slidably mounted inside the bore so as to be reciprocally moveable in the bore along a longitudinal axis thereof between an advanced releasing position and a retracted locking position;

engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the spindle;

an actuating member arranged inside the housing, wherein the actuating member is slidably mounted to the spindle so as to be moveable in relation to the spindle in the axial direction thereof;

a motion transferring mechanism arranged inside the housing, wherein the motion transferring mechanism is mounted to the spindle and configured to transfer an axial movement of the actuating member in a first axial direction in relation to the spindle into a movement of the drawbar from the advanced releasing position to the retracted locking position;

a hydraulic actuator arranged in or mounted on the housing and configured to move the actuating member axially in relation to the spindle, wherein the hydraulic actuator includes a piston unit slidably received in a space of the hydraulic actuator and configured to divide this space into first and second hydraulic chambers;

a first hydraulic line connected to the first hydraulic chamber, wherein hydraulic fluid is feedable into and dischargeable from the first hydraulic chamber via the first hydraulic line;

a second hydraulic line connected to the second hydraulic chamber, wherein hydraulic fluid is feedable into and dischargeable from the second hydraulic chamber via the second hydraulic line wherein the piston unit is moveable in a first direction by feeding of hydraulic fluid into the first hydraulic chamber via the first hydraulic line in order to allow the piston unit to exert, directly or via a connecting element, a pulling or pushing force on the actuating member in said first axial direction and thereby effect a movement of the drawbar from the advanced releasing position to the retracted locking position, the piston unit being moveable in an opposite second direction by feeding of hydraulic fluid into the second hydraulic chamber via the second hydraulic line, wherein the actuating member is rotatable in relation to the piston unit together with the spindle; and a first valve assembly arranged in the second hydraulic line, the first valve assembly including first and second flow channels arranged in parallel with each other, a first check valve in the form of a spring-loaded check valve, which is arranged in the first flow channel and which is configured to allow flow of hydraulic fluid through the first flow channel towards the second hydraulic chamber and obstruct flow of hydraulic fluid through the first flow channel away from the second hydraulic chamber, and a second check valve in the form of a spring-loaded check valve, which is arranged in the second flow channel and which is configured to allow flow of hydraulic fluid through the second flow channel away from the second hydraulic chamber when the hydraulic pressure in the second hydraulic chamber exceeds a cracking pressure of the second check valve and obstruct flow of hydraulic fluid through the second flow channel towards the second hydraulic chamber, wherein the actuating member is a sleeve, and wherein the actuating member is arranged around a peripheral wall of the spindle and slidably mounted to the peripheral wall so as to be axially moveable in relation to the spindle, the motion transferring mechanism including two or more wedges spaced apart in a circumferential direction of the spindle, each wedge being received in a respective aperture that extends radially through the peripheral wall of the spindle, wherein the wedges are configured to press the drawbar towards the retracted locking position when they are pressed radially inwards in the associated apertures, wherein each wedge includes a first pressure receiving surface which faces outwards from the spindle, wherein the actuating member on its inner side is provided with a first pressure applying surface which faces inwards for contacting the first pressure receiving surface on each wedge, the first pressure applying surface having a radial distance to the longitudinal axis that increases as seen in said first axial direction, and wherein the first pressure applying surface is configured to press each wedge radially inwards in the associated aperture by pressing against the first pressure receiving surface on each wedge when the actuating member is moved in said first axial direction.

2. The clamping device according to claim 1, wherein the actuating member is configured to assume a self-locking axial position on the spindle when the drawbar has been forced into the retracted locking position under the effect of the actuating member and the motion transferring mechanism, so as to thereby keep the drawbar in the retracted locking position.

3. The clamping device according to claim 1, wherein the cracking pressure of the second check valve is 0.2-2 MPa.

4. The clamping device according to claim 1, wherein the first check valve has a cracking pressure of 0.1 MPa or higher.

5. The clamping device according to claim 1, wherein the first valve assembly is arranged in or mounted on the housing.

6. The clamping device according to claim 1, further comprising a hydraulic accumulator in the form of a spring-loaded accumulator, which is arranged in fluid communication with the second hydraulic chamber.

7. The clamping device according to claim 6, wherein the hydraulic accumulator is dimensioned for a maximum accumulation pressure that is lower than the cracking pressure of the second check valve, corresponding to 80-90% of the cracking pressure of the second check valve.

8. The clamping device according to claim 1, further comprising a second valve assembly, arranged in the first hydraulic line including third and fourth flow channels arranged in parallel with each other, a third check valve in the form of a spring-loaded check valve, which is arranged in the third flow channel and which is configured to allow flow of hydraulic fluid through the third flow channel towards the first hydraulic chamber and obstruct flow of hydraulic fluid through the third flow channel away from the first hydraulic chamber, and a fourth check valve in the form of a spring-loaded check valve, which is arranged in the fourth flow channel and which is configured to allow flow of hydraulic fluid through the fourth flow channel away from the first hydraulic chamber when the hydraulic pressure in the first hydraulic chamber exceeds a cracking pressure of the fourth check valve and obstruct flow of hydraulic fluid through the fourth flow channel towards the first hydraulic chamber, wherein the cracking pressure of the fourth check valve has such a value that the following condition is fulfilled: $p_{C4}<p_{C2}\cdot A_2/A_1$, where $p_{C2}$ is the cracking pressure of the second check valve, $p_{C4}$ is the cracking pressure of the fourth check valve, $A_1$ is the effective pressure area on the side of the piston unit facing the first hydraulic chamber and $A_2$ is the effective pressure area on the side of the piston unit facing the second hydraulic chamber.

9. The clamping device according to claim 8, wherein the third check valve has a cracking pressure of 0.1 MPa or higher.

10. The clamping device according to claim 1, wherein the first pressure applying surface and the first pressure receiving surfaces are inclined in relation to the longitudinal axis by an angle such that the wedges will keep the actuating member in a self-locking axial position on the spindle when the drawbar has been forced into the retracted locking position under the effect of the actuating member and the wedges.

11. The clamping device according to claim 10, wherein each wedge includes a second pressure receiving surface which faces outwards from the spindle, wherein the actuating member on its inner side is provided with a second pressure applying surface which faces inwards for contacting the second pressure receiving surface on each wedge, the second pressure applying surface having a radial distance to the longitudinal axis that increases as seen in said first axial direction, wherein the second pressure applying surface and the second pressure receiving surfaces are inclined in relation to the longitudinal axis by an angle β which is larger than the angle α, and wherein the first and second pressure applying surfaces and the first and second pressure receiving surfaces are arranged consecutively on the actuating member and on each wedge, respectively, such that, upon a movement of the actuating member in the first axial direction, the second pressure applying surface is configured to slide and press against the second pressure receiving surface on each wedge during a first phase of the movement and the first pressure applying surface is configured to slide and press against the first pressure receiving surface on each wedge during a subsequent second phase of the movement.

12. The clamping device according to claim 1, wherein the piston unit is annular and extends around the spindle.

13. The clamping device according to claim 12, wherein an annular external protuberance is provided on the outer side of the actuating member, wherein the piston unit is configured to exert said pulling or pushing force on the actuating member by acting on this external protuberance, wherein an annular internal protuberance is provided on an inner side of the piston unit, wherein a lock ring is fixed to the piston unit on the inner side thereof, wherein the lock ring and the internal protuberance are spaced apart in the axial direction of the piston unit, and wherein the external protuberance on the actuating member is received with play in a gap formed between the internal protuberance and the lock ring.

* * * * *